United States Patent
Venkataramanappa et al.

(10) Patent No.: US 10,725,998 B2
(45) Date of Patent: *Jul. 28, 2020

(54) DISTRIBUTED AVAILABILITY GROUPS OF DATABASES FOR DATA CENTERS INCLUDING FAILOVER TO REGIONS IN DIFFERENT TIME ZONES

(71) Applicant: Microsoft Technology Licensing, LLC, Redmond, WA (US)

(72) Inventors: Girish Mittur Venkataramanappa, Redmond, WA (US); Zhengguo Sun, Redmond, WA (US); Varun Kunjbihari Tibrewal, Kirkland, WA (US); Steven John Lindell, Bellevue, WA (US); Sameer Arun Verkhedkar, Issaquah, WA (US); Sandeep Lingam, Redmond, WA (US); Colin Neville, Redmond, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 508 days.

This patent is subject to a terminal disclaimer.

(21) Appl. No.: 15/402,781

(22) Filed: Jan. 10, 2017

(65) Prior Publication Data

US 2018/0096068 A1 Apr. 5, 2018

Related U.S. Application Data

(63) Continuation of application No. 15/282,220, filed on Sep. 30, 2016.

(51) Int. Cl.
*G06F 7/00* (2006.01)
*G06F 17/00* (2019.01)
(Continued)

(52) U.S. Cl.
CPC ...... *G06F 16/2365* (2019.01); *G06F 11/1451* (2013.01); *G06F 11/1464* (2013.01);
(Continued)

(58) Field of Classification Search
None
See application file for complete search history.

(56) References Cited

U.S. PATENT DOCUMENTS 6,625,747 B1 9/2003 Tawil et al.
6,820,098 B1 * 11/2004 Ganesh ............... G06F 11/2074
(Continued)

OTHER PUBLICATIONS

"Non Final Office Action Issued in U.S. Appl. No. 15/282,220", dated Feb. 15, 2019, 29 Pages.
(Continued)

*Primary Examiner* — Tuan A Pham
(74) *Attorney, Agent, or Firm* — Ray Quinney & Nebeker; Thomas M. Hardman; Timothy J. Churna

(57) ABSTRACT

A Distributed Availability Group (DAG) spans two AGs, each spanning one or more replica nodes and functioning as primary or secondary AG. A primary AG is replicated to the secondary AG synchronously or asynchronously. A failover in the DAG results in the AGs swapping their roles. Multiple DAGs can be linked together as a chain, which provides many useful features including disaster recovery across geographical regions, massive read scale (numerous readable secondary nodes), online migration of databases (across different operating systems and computing environments). The systems using DAGs can replicate databases across multiple independent high availability (HA) failover clusters using complex replication topologies and allow for manual failover and failback. The systems allow chaining of multiple AGs to provision a treelike structure of replicas and numerous secondary replicas without impacting perfor-
(Continued)

mance. The systems automatically seed new database replicas to facilitate building a complex topology of DAGs.

20 Claims, 9 Drawing Sheets

(51) Int. Cl.
| | |
|---|---|
| *G06F 16/23* | (2019.01) |
| *G06F 16/27* | (2019.01) |
| *G06F 16/182* | (2019.01) |
| *G06F 11/20* | (2006.01) |
| *G06F 11/14* | (2006.01) |

(52) U.S. Cl.
CPC ...... *G06F 11/1469* (2013.01); *G06F 11/1471* (2013.01); *G06F 11/1474* (2013.01); *G06F 11/2028* (2013.01); *G06F 11/2033* (2013.01); *G06F 11/2035* (2013.01); *G06F 11/2041* (2013.01); *G06F 11/2048* (2013.01); *G06F 11/2097* (2013.01); *G06F 16/183* (2019.01); *G06F 16/1844* (2019.01); *G06F 16/2358* (2019.01); *G06F 16/2379* (2019.01); *G06F 16/27* (2019.01); *G06F 2201/80* (2013.01); *G06F 2201/805* (2013.01); *G06F 2201/82* (2013.01)

(56) References Cited

U.S. PATENT DOCUMENTS

| | | | |
|---|---|---|---|
| 8,850,018 | B2 | 9/2014 | Massa et al. |
| 9,354,979 | B2* | 5/2016 | Fiske .................. G06F 11/1471 |
| 9,405,816 | B2 | 8/2016 | Verbitski et al. |
| 2005/0097391 | A1 | 5/2005 | Boyd et al. |
| 2005/0172161 | A1 | 8/2005 | Cruz et al. |
| 2006/0090095 | A1* | 4/2006 | Massa .................. G06F 11/1479 714/4.11 |
| 2006/0248212 | A1* | 11/2006 | Sherer ............... H04L 29/06027 709/231 |
| 2008/0052327 | A1 | 2/2008 | Buah |
| 2008/0288646 | A1 | 11/2008 | Hasha et al. |
| 2010/0232288 | A1* | 9/2010 | Coatney .............. G06F 11/2033 370/221 |
| 2011/0178984 | A1 | 7/2011 | Talius et al. |
| 2011/0313973 | A1 | 12/2011 | Srivas et al. |
| 2012/0124000 | A1* | 5/2012 | Rana .................. H04L 67/1095 707/620 |
| 2012/0303576 | A1* | 11/2012 | Calder ................ G06F 11/2076 707/611 |
| 2012/0303577 | A1* | 11/2012 | Calder ................ G06F 11/2074 707/613 |
| 2012/0303581 | A1* | 11/2012 | Calder .................... G06F 16/27 707/626 |
| 2013/0110781 | A1 | 5/2013 | Golab et al. |
| 2013/0346790 | A1 | 12/2013 | Elpula et al. |
| 2014/0310246 | A1 | 10/2014 | Vijayan et al. |
| 2015/0227431 | A1 | 8/2015 | Fiske et al. |
| 2015/0254325 | A1 | 9/2015 | Stringham |
| 2016/0034481 | A1* | 2/2016 | Kumarasamy .......... G06F 11/16 707/639 |
| 2016/0065670 | A1 | 3/2016 | Kimmel et al. |
| 2016/0078116 | A1 | 3/2016 | Alewine et al. |
| 2016/0085543 | A1 | 3/2016 | Islam |
| 2016/0085648 | A1 | 3/2016 | Joshi et al. |
| 2016/0085837 | A1 | 3/2016 | Kotagiri |
| 2016/0092322 | A1* | 3/2016 | Nosov ................. G06F 11/2007 714/4.11 |
| 2016/0103740 | A1* | 4/2016 | Bogdanov ........... G06F 11/2023 714/19 |
| 2016/0179418 | A1 | 6/2016 | Watanabe et al. |
| 2016/0179642 | A1 | 6/2016 | Cai |
| 2016/0196322 | A1* | 7/2016 | Xu ........................ G06F 16/275 707/611 |
| 2016/0224441 | A1 | 8/2016 | Arnold et al. |

OTHER PUBLICATIONS

"Non Final Office Action Issued in U.S. Appl. No. 15/402,706", dated Mar. 21, 2019, 24 Pages.
"Manage Chained Replication", Retrieved on: Aug. 17, 2016 Available at: https://docs.mongodb.com/manual/tutorial/manage-chained-replication/.
"Failover and Replication in a Cluster", Published on: Dec. 1, 2011 Available at: https://docs.oracle.com/cd/E13222_01/wls/docs90/cluster/failover.html.
"Distributed Availability Groups (Always on Availability Groups)", Published on: May 13, 2016 Available at: https://msdn.microsoft.com/en-us/library/mt651673.aspx.
Campbell, Michael K., "AlwaysOn Availability Groups and SQL Server Jobs, Part 2: Putting Always on into Context", Published on: Aug. 28, 2014 Available at: http://sqlmag.com/blog/sqlserver-alwayson-availability-groups-putting-alwayson-into-context.
Assaf, William, "Perform a Forced Manual Failover of an Availability Group (SQL Server)", Retrieved on: Aug. 17, 2016 Available at: https://msdn.microsoft.com/en-us/library/ff877957.aspx.
"Final Office Action issued in U.S. Appl. No. 15/282,220", dated Aug. 30, 2019, 30 Pages.
"Non Final Office Action Issued in U.S. Appl. No. 15/402,756", dated Apr. 18, 2019, 26 Pages.
"Non Final Office Action Issued in U.S. Appl. No. 15/402,729", dated Jun. 12, 2019, 23 Pages.
"Final Office Action Issued in U.S. Appl. No. 15/402,706", dated Sep. 13, 2019, 26 Pages.
"Non Final Office Action Issued in U.S. Appl. No. 15/402,706", dated Dec. 11, 2019, 29 Pages.
"Final Office Action Issued in U.S. Appl. No. 15/402,729", dated Dec. 12, 2019, 26 Pages.
"Final Office Action Issued in U.S. Appl. No. 15/402,756", dated Nov. 12, 2019, 27 Pages.
"Non-Final Office Action Issued in U.S. Appl. No. 15/282,220", dated Apr. 2, 2020, 36 pages.
"Non-Final Office Action Issued in U.S. Appl. No. 15/402,756", dated Apr. 14, 2020, 31 Pages.
"Non-Final Office Action Issued in U.S. Appl. No. 15/402,729", dated May 8, 2020, 30 Pages.
"Final Office Action Issued in U.S. Appl. No. 15/402,706", dated Jun. 11, 2020, 34 Pages.

\* cited by examiner

DISTRIBUTED AVAILABILITY GROUPS OF DATABASES FOR DATA CENTERS INCLUDING FAILOVER TO REGIONS IN DIFFERENT TIME ZONES

CROSS-REFERENCE TO RELATED APPLICATIONS

The present disclosure is a continuation of U.S. patent application Ser. No. 15/282,220 filed on Sep. 30, 2016. The entire disclosure of the application referenced above is incorporated herein by reference.

FIELD

The present disclosure relates generally to database management systems and more particularly to distributed availability groups of databases for data centers.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Server systems used in today's data centers, each including multiple servers and located in a different geographical region, may support online transaction processing (OLTP) systems. Presently, however, the server systems used in the data centers face many obstacles. For example, currently there is no cross-region availability and geographical disaster recovery (GeoDR) for On Premise SQL servers. The current systems cannot provision massive read-scale by allowing for unlimited number of readable secondary servers. The primary servers in the current systems employ a star topology for database replication across multiple secondary servers. The enormous task of replication from one primary server to multiple secondary servers burdens the primary server and degrades the performance of the OLTP systems. The current systems also do not allow for online migration without downtime from an On Premise SQL server to an SQL infrastructure-as-a-service (IAAS) cloud server and from an SQL server running on one operating system (e.g., Windows) to an SQL server running on another operating system (e.g., Linux). Further, the current systems cannot provision high availability of databases when upgrading the operating system across versions, where the operating system failover clustering is not compatible with its previous version.

SUMMARY

A system comprises a processor and memory and an application executed by the processor and memory. The application configures a first server to perform read and write operations for an online transaction processing system using a relational database on the first server. The application is configured to send a first log stream associated with the relational database from the first server to a second server to replicate the relational database on the second server. The second server is configured to perform read operations for the online transaction processing system using the relational database on the second server replicated using the first log stream received from the first server. In response to a failure of the first server, the second server takes over and performs read and write operations for the online transaction processing system using the relational database on the second server replicated using the first log stream received from the first server.

In other features, the first log stream along with a corresponding data stream represents a replica of the relational database on the first server. The application is further configured to send the first log stream along with the corresponding data stream directly to the second server without saving a copy of the first log stream and the corresponding data stream.

In other features, the application is further configured to automatically send a second log stream associated with the relational database on the first server from the first server to the second server after the first server generates a new log file following a write operation to the relational database on the first server. The second log stream along with a corresponding data stream represents a replica of the relational database on the first server following the write operation. The second server is configured to replicate the relational database using the second log stream and to perform read operations for the online transaction processing system using the relational database on the second server replicated using the second log stream.

In other features, the application is further configured to acknowledge a write operation to the relational database on the first server as being successful after the first server sends a second log stream associated with the relational database on the first server to the second server following the write operation, the second log stream along with a corresponding data stream representing a replica of the relational database on the first server following the write operation, and after the second server replicates the relational database using the second log stream.

In other features, the first and second servers execute different operating systems.

In other features, the first and second servers execute different versions of an operating system.

In other features, one of the first and second servers is located in a cloud-based computing environment.

In other features, the second server is configured to send the first log stream to a third server to replicate the relational database on the third server. The first log stream along with a corresponding data stream represents a replica of the relational database on the first server. The third server is configured to perform read operations for the online transaction processing system using the relational database replicated on the third server using the first log stream.

In other features, the second server is configured to send the first log stream to a plurality of servers to replicate the relational database on each of the plurality of servers. The first log stream along with a corresponding data stream represents a replica of the relational database on the first server. Each of the plurality of servers is configured to perform read operations for the online transaction processing system using the relational database replicated on the respective servers using the first log stream.

In other features, the second server is geographically remote from the first server. The first server is configured to send the first log stream to a first set of servers to replicate the relational database on each of the first set of servers. Each of the first set of servers is configured to perform read operations for the online transaction processing system using the relational database replicated on the respective first set of servers using the first log stream. The second server is configured to send the first log stream to a second set of servers to replicate the relational database on each of the second set of servers. Each of the second set of servers is configured to perform read operations for the online transaction processing system using the relational database replicated on the respective second set of servers using the first log stream.

In other features, the application is further configured to acknowledge a write operation to the relational database on the first server as being successful after a majority of the second server and the first set of servers complete replicating the respective relational databases following the write operation.

In other features, the application is further configured to acknowledge a write operation to the relational database on the first server as being successful after the first set of servers and the second server complete replicating the respective relational databases following the write operation.

In other features, the second server is configured to indicate replication of the relational database on the second server as being complete after the replication of the relational database is completed on the second server and each of the second set of servers following the write operation.

In other features, the application is further configured to send the first log stream from the first server to a third server located in a different time zone than the first server to replicate the relational database on the third server. The third server is configured to perform read operations for the online transaction processing system, using the relational database replicated on the third server using the first log stream received from the first server, during a first time period of a day during which the first server is configured to perform read and write operations for the online transaction processing system using the relational database on the first server. The third server is configured to take over and perform read and write operations for the online transaction processing system, using the relational database replicated on the third server using the first log stream received from the first server, during a second time period of the day during which the first server is configured to perform read operations for the online transaction processing system using the relational database on the first server.

In other features, the application is further configured to send the first log stream from the first server to a third server to replicate the relational database on the third server. The third server is configured to perform read operations for the online transaction processing system using the relational database on the third server.

In other features, the second server is configured to send the first log stream to a first set of servers to replicate the relational database on each server of the first set of servers. Each of the first set of servers is configured to perform read operations for the online transaction processing system using the relational database replicated on the respective first set of servers using the first log stream. The third server is configured to send the first log stream to a second set of servers to replicate the relational database on each server of the second set of servers. Each of the second set of servers is configured to perform read operations for the online transaction processing system using the relational database replicated on the respective second set of servers using the first log stream.

In still other features, a method comprises performing read and write operations for an online transaction processing system using a relational database on a first server. The method further comprises sending a first log stream from the first server directly to a second server to perform read operations for the online transaction processing system using a replica of the relational database generated on the second server using the first log stream received from the first server. The first log stream along with a corresponding data stream represents a replica of the relational database following a write operation to the relational database. The method further comprises acknowledging the write operation to the relational database on the first server as being successful in response to receiving an indication from the second server that the second server successfully completed replication of the relational database on the second server after receiving the first log stream from the first server. The method further comprises performing, in response to a failure of the first server, read and write operations for the online transaction processing system using the replica of the relational database on the second server.

In other features, the first and second servers execute different operating systems and are located in different geographical locations.

In still other features, a system comprises a processor and memory and an application executed by the processor and memory. The application configures a first server to perform read and write operations for an online transaction processing system using a relational database on the first server. The application is configured to send a first log stream from the first server directly to a second server to replicate the relational database on the second server. The first log stream along with a corresponding data stream represents a replica of the relational database following a write operation to the relational database. The second server is configured to perform read operations for the online transaction processing system using the relational database on the second server replicated using the first log stream received from the first server. The application is configured to acknowledge the write operation to the relational database on the first server as being successful in response to receiving an indication from the second server that the second server successfully completed replication of the relational database on the second server after receiving the first log stream from the first server. In response to a failure of the first server, the second server is configured to take over and perform read and write operations for the online transaction processing system using the relational database on the second server replicated using the first log stream received from the first server.

In other features, the first and second servers execute different operating systems and are located in different geographical locations.

In still other features, a method comprises performing, using a first server, read and write operations for an online transaction processing system using a relational database on the first server. The method further comprises sending a first log stream associated with the relational database from the first server to a second server to replicate the relational database on the second server. The method further comprises performing, using the second server, read operations for the online transaction processing system using the relational database on the second server replicated using the first log stream received from the first server. The method further comprises performing, in response to a failure of the first server, using the second server, read and write operations for the online transaction processing system using the relational database on the second server replicated using the first log stream received from the first server.

In other features, the first log stream along with a corresponding data stream represents a replica of the relational database on the first server. The method further comprises sending the first log stream along with the corresponding data stream directly to the second server without saving a copy of the first log stream and the corresponding data stream.

In other features, the method further comprises automatically sending a second log stream associated with the relational database on the first server from the first server to the second server after the first server generates a new log file following a write operation to the relational database on the first server. The second log stream along with a corresponding data stream represents a replica of the relational database on the first server following the write operation. The method further comprises replicating the relational database on the second server using the second log stream. The method further comprises performing read operations for the online transaction processing system using the relational database on the second server replicated using the second log stream.

In other features, the method further comprises acknowledging a write operation to the relational database on the first server as being successful after the first server sends a second log stream associated with the relational database on the first server to the second server following the write operation, the second log stream along with a corresponding data stream representing a replica of the relational database on the first server following the write operation, and after the second server replicates the relational database using the second log stream.

In other features, the method further comprises executing different operating systems on the first and second servers.

In other features, the method further comprises executing different versions of an operating system on the first and second servers.

In other features, one of the first and second servers is located in a cloud-based computing environment.

In other features, the method further comprises sending the first log stream from the second server to a third server to replicate the relational database on the third server. The first log stream along with a corresponding data stream represents a replica of the relational database on the first server. The method further comprises performing, using the third server, read operations for the online transaction processing system using the relational database replicated on the third server using the first log stream.

In other features, the method further comprises sending the first log stream from the second server to a plurality of servers. The first log stream along with a corresponding data stream represents a replica of the relational database on the first server. The method further comprises replicating the relational database on each of the plurality of servers. The method further comprises performing, using each of the plurality of servers, read operations for the online transaction processing system using the relational database replicated on the respective servers using the first log stream.

In other features, the second server is geographically remote from the first server. The method further comprises sending the first log stream from the first server to a first set of servers to replicate the relational database on each of the first set of servers. The method further comprises performing, using each of the first set of servers, read operations for the online transaction processing system using the relational database replicated on the respective first set of servers using the first log stream. The method further comprises sending the first log stream from the second server to a second set of servers to replicate the relational database on each of the second set of servers. The method further comprises performing, using each of the second set of servers, read operations for the online transaction processing system using the relational database replicated on the respective second set of servers using the first log stream.

In other features, the method further comprises acknowledging a write operation to the relational database on the first server as being successful after a majority of the second server and the first set of servers complete replicating the respective relational databases following the write operation.

In other features, the method further comprises acknowledging a write operation to the relational database on the first server as being successful after the first set of servers and the second server complete replicating the respective relational databases following the write operation.

In other features, the method further comprises indicating replication of the relational database on the second server as being complete after the replication of the relational database is completed on the second server and each of the second set of servers following the write operation.

In other features, the method further comprises sending the first log stream from the first server to a third server located in a different time zone than the first server to replicate the relational database on the third server. The method further comprises performing, using the third server, read operations for the online transaction processing system, using the relational database replicated on the third server using the first log stream received from the first server, during a first time period of a day during which the first server is configured to perform read and write operations for the online transaction processing system using the relational database on the first server. The method further comprises performing, using the third server, read and write operations for the online transaction processing system, using the relational database replicated on the third server using the first log stream received from the first server, during a second time period of the day during which the first server is configured to perform read operations for the online transaction processing system using the relational database on the first server.

In other features, the method further comprises sending the first log stream from the first server to a third server to replicate the relational database on the third server. The method further comprises performing, using the third server, read operations for the online transaction processing system using the relational database on the third server.

In other features, the method further comprises sending the first log stream from the second server to a first set of servers to replicate the relational database on each server of the first set of servers. The method further comprises performing, using each of the first set of servers, read operations for the online transaction processing system using the relational database replicated on the respective first set of servers using the first log stream. The method further comprises sending the first log stream from the third server to a second set of servers to replicate the relational database on each server of the second set of servers. The method further comprises performing, using each of the second set of servers, read operations for the online transaction processing system using the relational database replicated on the respective second set of servers using the first log stream.

In still other features, a method comprises performing, using a first server, read and write operations for an online transaction processing system using a relational database on the first server. The method further comprises sending a first log stream from the first server directly to a second server. The first log stream along with a corresponding data stream represents a replica of the relational database following a write operation to the relational database. The method further comprises replicating the relational database on the second server. The method further comprises performing, using the second server, read operations for the online transaction processing system using the relational database on the second server replicated using the first log stream received from the first server. The method further comprises acknowledging the write operation to the relational database on the first server as being successful in response to receiving an indication from the second server that the second server successfully completed replication of the relational database on the second server after receiving the first log stream from the first server. The method further comprises performing, in response to a failure of the first server, using the second server, read and write operations for the online transaction processing system using the relational database on the second server replicated using the first log stream received from the first server.

In other features, the method further comprises executing different operating systems on the first and second servers located in different geographical locations.

In still other features, a system comprises a processor and memory and an application executed by the processor and memory. The application is configured to perform read and write operations for an online transaction processing system using a relational database on a first server. The application is configured to send, following a write operation to the relational database on the first server, a log file associated with the relational database on the first server from the first server directly to a second server. The second server is configured to replicate the relational database on the second server using the log file to prevent data loss in an event that the first server fails. The second server is configured to perform read operations for the online transaction processing system using the replicated relational database on the second server.

In other features, the application is configured to send the log file along with a corresponding data file from the first server to the second server without saving a copy of the log file and the corresponding data file.

In other features, the application is further configured to acknowledge the write operation to the relational database on the first server as being successful after receiving a confirmation from the second server that the second server successfully completed replication of the relational database on the second server after receiving the log file.

In other features, in response to a failure of the first server, the second server is configured to perform the read and write operations using the replicated relational database on the second server.

In other features, the first and second servers execute different operating systems.

In other features, the first and second servers execute different versions of an operating system.

In other features, one of the first and second servers is located in a cloud-based computing environment.

In still other features, a method comprises performing read and write operations for an online transaction processing system using a relational database on a first server. The method further comprises sending, following a write operation to the relational database on the first server, a log file associated with the relational database on the first server from the first server directly to a second server to replicate the relational database on the second server using the log file to prevent data loss in an event that the first server fails and to perform read operations for the online transaction processing system using the replicated relational database on the second server.

In other features, the method further comprises sending the log file along with a corresponding data file from the first server to the second server without saving a copy of the log file and the corresponding data file.

In other features, the method further comprises acknowledging the write operation to the relational database on the first server as being successful after receiving a confirmation from the second server that the second server successfully completed replication of the relational database on the second server after receiving the log file.

In other features, the method further comprises performing the read and write operations using the replicated relational database on the second server in response to a failure of the first server.

In other features, the method further comprises executing different operating systems on the first and second servers.

In other features, the method further comprises executing different versions of an operating system on the first and second servers.

In other features, one of the first and second servers is located in a cloud-based computing environment.

In still other features, a system comprises a processor and memory and an application executed by the processor and memory. The application is configured to perform read and write operations for an online transaction processing system using a relational database on a first server. The application is configured to send, following a write operation to the relational database on the first server, a log file associated with the relational database on the first server from the first server directly to a second server to replicate the relational database on the second server using the log file. The application is configured to acknowledge the write operation to the relational database on the first server as being successful after receiving a confirmation from the second server that the second server successfully completed replication of the relational database on the second server after receiving the log file. The second server is configured to perform read operations for the online transaction processing system using the replicated relational database on the second server. In response to a failure of the first server, the second server is configured to perform the read and write operations using the replicated relational database on the second server.

In other features, the application is configured to send the log file along with a corresponding data file from the first server to the second server without saving a copy of the log file and the corresponding data file.

In other features, the first and second servers execute different operating systems.

In other features, the first and second servers execute different versions of an operating system.

In other features, one of the first and second servers is located in a cloud-based computing environment.

In still other features, a system comprises a processor and memory and an application executed by the processor and memory. The application is configured to receive, from a first server configured to perform read and write operations for an online transaction processing system using a relational database on the first server, following a write operation to the relational database on the first server, a log file associated with the relational database on the first server. The application is configured to replicate the relational database on a second server using the log file to perform read operations for the online transaction processing system using the relational database on the second server. The application is configured to send the log file from the second server to a third server to replicate the relational database on the third server using the log file received from the second server to perform read operations for the online transaction processing system using the replicated relational database on the third server. The application increases a read performance of the online transaction processing system using the second and third servers without decreasing a read and write performance of the online transaction processing system on the first server.

In other features, sending the log file from the second server to the third server and not from the first server to the third server reduces a load on the first server.

In other features, the application is configured to receive the log file along with a corresponding data file directly from the first server without the first server saving a copy of the log file and the corresponding data file.

In other features, the application is configured to send the log file along with a corresponding data file from the second server directly to the third server without saving a copy of the log file and the corresponding data file.

In other features, the application is further configured to send a confirmation from the second server to the first server that the second server successfully completed replication of the relational database on the second server after receiving the log file from the first server. The first server is configured to acknowledge the write operation to the relational database on the first server as being successful after receiving the confirmation from the second server.

In other features, the application is further configured to send the confirmation from the second server to the first server after receiving a confirmation from the third server that the third server successfully completed replication of the relational database on the third server after receiving the log file from the second server.

In other features, in response to a failure of the first server, the application configures the second server or the third server to perform the read and write operations using the replicated relational database on the respective server.

In other features, the first server and at least one of the second and third servers execute different operating systems.

In other features, the first server and at least one of the second and third servers execute different versions of an operating system.

In still other features, a method comprises receiving, from a first server configured to perform read and write operations for an online transaction processing system using a relational database on the first server, following a write operation to the relational database on the first server, a log file associated with the relational database on the first server. The method further comprises replicating the relational database on a second server using the log file to perform read operations for the online transaction processing system using the relational database on the second server. The method further comprises sending the log file from the second server to a third server to replicate the relational database on the third server using the log file received from the second server to perform read operations for the online transaction processing system using the replicated relational database on the third server. The method further comprises increasing a read performance of the online transaction processing system using the second and third servers without decreasing a read and write performance of the online transaction processing system on the first server.

In other features, the method further comprises reducing a load on the first server by sending the log file from the second server to the third server and not from the first server to the third server reduces a load on the first server.

In other features, the method further comprises receiving the log file along with a corresponding data file directly from the first server without the first server saving a copy of the log file and the corresponding data file.

In other features, the method further comprises sending the log file along with a corresponding data file from the second server directly to the third server without saving a copy of the log file and the corresponding data file.

In other features, the method further comprises sending a confirmation from the second server to the first server that the second server successfully completed replication of the relational database on the second server after receiving the log file from the first server. The method further comprises acknowledging the write operation to the relational database on the first server as being successful after receiving the confirmation from the second server.

In other features, the method further comprises sending the confirmation from the second server to the first server after receiving a confirmation from the third server that the third server successfully completed replication of the relational database on the third server after receiving the log file from the second server.

In other features, the method further comprises performing the read and write operations using the replicated relational database on the second server or the third server in response to a failure of the first server.

In other features, the method further comprises executing different operating systems on the first server and at least one of the second and third servers.

In other features, the method further comprises executing different versions of an operating system on the first server and at least one of the second and third servers.

In still other features, a system comprising a processor and memory and an application executed by the processor and memory. The application is configured to receive, from a first server configured to perform read and write operations for an online transaction processing system using a relational database on the first server, following a write operation to the relational database on the first server, a log file associated with the relational database on the first server. The application is configured to replicate the relational database on a second server using the log file to perform read operations for the online transaction processing system using the relational database on the second server. The application is configured to send the log file from the second server to a third server to replicate the relational database on the third server using the log file received from the second server to perform read operations for the online transaction processing system using the replicated relational database on the third server. The application is configured to receive a first confirmation from the third server that the third server successfully completed replication of the relational database on the third server after receiving the log file from the second server. The application is configured to send, in response to receiving the first confirmation, a second confirmation from the second server to the first server that the second server successfully completed replication of the relational database on the second server after receiving the log file from the first server. The first server is configured to acknowledge the write operation to the relational database on the first server as being successful after receiving the second confirmation from the second server. The application increases a read performance of the online transaction processing system using the second and third servers without decreasing a read and write performance of the online transaction processing system on the first server.

In other features, the first server and at least one of the second and third servers execute different operating systems. The application is further configured to receive the log file along with a corresponding data file directly from the first server without the first server saving a copy of the log file and the corresponding data file and to send the log file along with the corresponding data file from the second server directly to the third server without saving a copy of the log file and the corresponding data file.

In still other features, a system comprises a processor and memory and an application executed by the processor and memory. The application is configured to perform read and write operations for an online transaction processing system using a relational database on a first server. The application is configured to send, following a write operation to the relational database on the first server, a log file associated with the relational database on the first server from the first server to a plurality of servers to replicate the relational database on the respective servers using the log file to perform read operations for the online transaction processing system. The application is configured to acknowledge the write operation to the relational database on the first server as being successful after receiving a confirmation from a predetermined number of servers from the plurality of servers that the predetermined number of servers successfully completed replication of the relational database on the respective servers after receiving the log file to increase reliability of the system in an event that the first server fails.

In other features, the predetermined number of servers includes more than half of the plurality of servers.

In other features, the predetermined number of servers includes all of the plurality of servers.

In other features, the application is configured to send the log file along with a corresponding data file from the first server to the plurality of servers without saving a copy of the log file and the corresponding data file.

In other features, in response to a failure of the first server, the application is configured perform the read and write operations for the online transaction processing system using the replicated relational database on one of the plurality of servers.

In other features, the first server and one of the plurality of servers execute different operating systems.

In other features, the first server and one of the plurality of servers execute different versions of an operating system.

In still other features, a method comprises performing read and write operations for an online transaction processing system using a relational database on a first server. The method further comprises sending, following a write operation to the relational database on the first server, a log file associated with the relational database on the first server from the first server to a plurality of servers to replicate the relational database on the respective servers using the log file to perform read operations for the online transaction processing system. The method further comprises acknowledging the write operation to the relational database on the first server as being successful after receiving a confirmation from a predetermined number of servers from the plurality of servers that the predetermined number of servers successfully completed replication of the relational database on the respective servers after receiving the log file to increase reliability of the system in an event that the first server fails.

In other features, the predetermined number of servers includes more than half of the plurality of servers.

In other features, the predetermined number of servers includes all of the plurality of servers.

In other features, the method further comprises sending the log file along with a corresponding data file from the first server to the plurality of servers without saving a copy of the log file and the corresponding data file.

In other features, the method further comprises performing the read and write operations for the online transaction processing system using the replicated relational database on one of the plurality of servers in response to a failure of the first server.

In other features, the method further comprises executing different operating systems on the first server and one of the plurality of servers.

In other features, the method further comprises executing different versions of an operating system on the first server and one of the plurality of servers.

In still other features, a system comprises a processor and memory and an application executed by the processor and memory. The application is configured to perform read and write operations for an online transaction processing system using a relational database on a first server. The application is configured to send, following a write operation to the relational database on the first server, a log file associated with the relational database on the first server from the first server to a plurality of servers to replicate the relational database on the respective servers using the log file to perform read operations for the online transaction processing system. The application is configured to acknowledge the write operation to the relational database on the first server as being successful after receiving a confirmation from a majority or all of the plurality of servers that the majority or all of the servers successfully completed replication of the relational database on the respective servers after receiving the log file. The application is configured to perform, in response to a failure of the first server, the read and write operations for the online transaction processing system using the replicated relational database on one of the plurality of servers.

In other features, the application is configured to send the log file along with a corresponding data file from the first server to the plurality of servers without saving a copy of the log file and the corresponding data file.

In other features, the first server and one of the plurality of servers execute different operating systems.

In other features, the first server and one of the plurality of servers execute different versions of an operating system.

In still other features, a system comprises a processor and memory and an application executed by the processor and memory. The application is configured to perform read and write operations for an online transaction processing system using a relational database on a first server during a first portion of a day during which a second server located in a different geographical location than the first server and having a replica of the relational database on the second server performs read operations for the online transaction processing system. The application is configured to perform read operations for the online transaction processing system during a second portion of the day during which the second server performs read and write operations for the online transaction processing system using the replica of the relational database on the second server to increase a response time for the read and write operations performed by the second server during the second portion of the day.

In other features, the application is further configured to send a log file associated with the relational database on the first server from the first server to the second server to replicate the relational database on the second server following a write operation to the relational database on the first server when the first server performs the read and write operations and the second server performs the read operations during the first portion of the day.

In other features, the application is further configured to send the log file along with a corresponding data file from the first server directly to the second server without saving a copy of the log file and the corresponding data file.

In other features, the application is further configured to receive a log file associated with the relational database on the second server from the second server to replicate the relational database on the first server following a write operation to the relational database on the second server when the second server performs the read and write operations and the first server performs the read operations during the second portion of the day.

In other features, the application is further configured to receive the log file along with a corresponding data file from the second server directly to the first server without saving a copy of the log file and the corresponding data file.

In other features, the application is further configured to perform the following during the first portion of the day: send a log file associated with the relational database on the first server from the first server to the second server following a write operation to the relational database on the first server, where the second server is configured to replicate the relational database on the second server using the log file; and acknowledge the write operation to the relational database on the first server as being successful after receiving a confirmation from the second server that the second server successfully completed replication of the relational database on the second server after receiving the log file.

In other features, the application is further configured to perform the following during the second portion of the day: receive from the second server a log file associated with the relational database on the second server following a write operation to the relational database on the second server; replicate the relational database on the first server using the log file; and send a confirmation from the first server to the second server that the first server successfully completed replication of the relational database on the first server after receiving the log file from the second server. The second server is configured to acknowledge the write operation to the relational database on the second server as being successful after receiving the confirmation.

In other features, the first and second servers execute different operating systems.

In other features, the first and second servers execute different versions of an operating system.

In other features, one of the first and second servers is located in a cloud-based computing environment.

In still other features, a method comprises performing read and write operations for an online transaction processing system using a relational database on a first server during a first portion of a day during which a second server located in a different geographical location than the first server and having a replica of the relational database on the second server performs read operations for the online transaction processing system. The method further comprises performing read operations for the online transaction processing system during a second portion of the day during which the second server performs read and write operations for the online transaction processing system using the replica of the relational database on the second server to increase a response time for the read and write operations performed by the second server during the second portion of the day.

In other features, the method further comprises sending a log file associated with the relational database on the first server from the first server to the second server to replicate the relational database on the second server following a write operation to the relational database on the first server when the first server performs the read and write operations and the second server performs the read operations during the first portion of the day.

In other features, the method further comprises sending the log file along with a corresponding data file from the first server directly to the second server without saving a copy of the log file and the corresponding data file.

In other features, the method further comprises receiving a log file associated with the relational database on the second server from the second server to replicate the relational database on the first server following a write operation to the relational database on the second server when the second server performs the read and write operations and the first server performs the read operations during the second portion of the day.

In other features, the method further comprises receiving the log file along with a corresponding data file from the second server directly to the first server without saving a copy of the log file and the corresponding data file.

In other features, the method further comprises performing the following during the first portion of the day: sending a log file associated with the relational database on the first server from the first server to the second server following a write operation to the relational database on the first server, where the second server is configured to replicate the relational database on the second server using the log file; and acknowledging the write operation to the relational database on the first server as being successful after receiving a confirmation from the second server that the second server successfully completed replication of the relational database on the second server after receiving the log file.

In other features, the method further comprises performing the following during the second portion of the day: receiving from the second server a log file associated with the relational database on the second server following a write operation to the relational database on the second server; replicating the relational database on the first server using the log file; sending a confirmation from the first server to the second server that the first server successfully completed replication of the relational database on the first server after receiving the log file from the second server; and acknowledging the write operation to the relational database on the second server as being successful after receiving the confirmation.

In other features, the method further comprises executing different operating systems or different versions of an operating system on the first and second servers.

In other features, one of the first and second servers is located in a cloud-based computing environment.

In still other features, a system comprises a processor and memory and an application executed by the processor and memory. The application is configured to perform read and write operations for an online transaction processing system using a relational database on a first server during a first portion of a day during which a second server located in a different geographical location than the first server and having a replica of the relational database on the second server performs read operations for the online transaction processing system. The application is configured to perform read operations for the online transaction processing system during a second portion of the day during which the second server performs read and write operations for the online transaction processing system using the replica of the relational database on the second server. The application is configured to send a log file associated with the relational database on the first server from the first server directly to the second server to replicate the relational database on the second server following a write operation to the relational database on the first server when the first server performs the read and write operations and the second server performs the read operations during the first portion of the day. The application is configured to acknowledge the write operation to the relational database on the first server as being successful after receiving a confirmation from the second server that the second server successfully completed replication of the relational database on the second server after receiving the log file. The application is configured to receive a log file associated with the relational database on the second server directly from the second server to replicate the relational database on the first server following a write operation to the relational database on the second server when the second server performs the read and write operations and the first server performs the read operations during the second portion of the day. The application is configured to send a confirmation from the first server to the second server that the first server successfully completed replication of the relational database on the first server after receiving the log file from the second server. The second server is configured to acknowledge the write operation to the relational database on the second server as being successful after receiving the confirmation from the first server. A response time for the read and write operations performed by the first server is increased during the first portion of the day. A response time for the read and write operations performed by the second server is increased during the second portion of the day.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
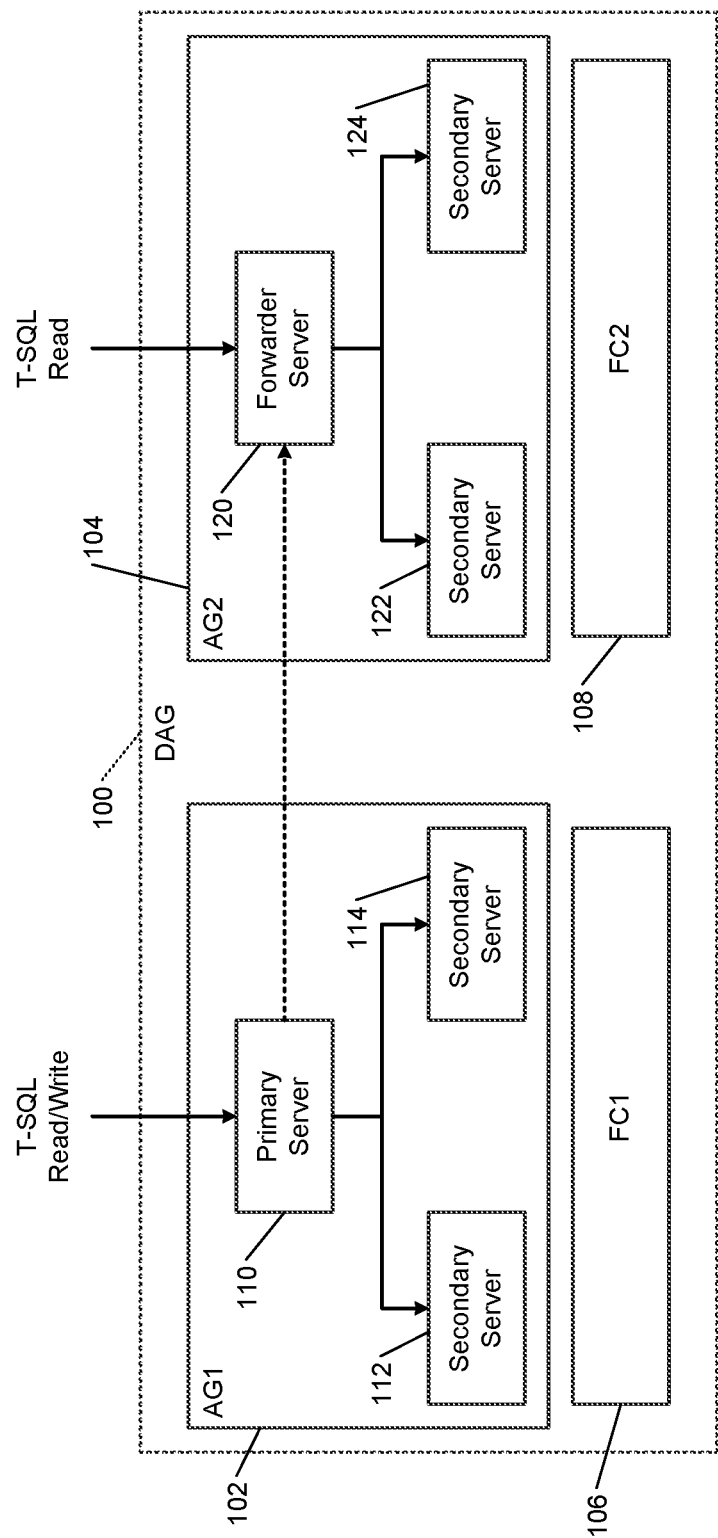
FIG. 1 is a functional block diagram of an example of a distributed availability group (DAG) architecture according to the present disclosure.

An SQL server provisions an Availability Group (AG) which allows users to group together a set of databases and replicate them across multiple replica nodes managed by a failover cluster, with a primary replica serving read and write online workloads, and secondary replicas that are hot standbys optionally allowing read operations. When the primary node fails, the failover cluster automatically promotes a secondary replica to become the primary node, thereby providing high availability (HA) for databases in the availability group (AG).

The present disclosure extends the concept of an Availability Group (AG) and introduces a new architecture called a Distributed Availability Group (DAG). While a regular AG spans one or more replica nodes, a DAG spans two AGs. Each of the participant AGs in the DAG has a role, either primary or secondary. A primary AG is replicated to the secondary AG either synchronously or asynchronously depending on the configuration. A failover in the DAG results in the participant AGs swapping their roles: the secondary AG becomes the primary AG, and the primary AG becomes the secondary AG. Multiple DAGs can be linked together as a chain. This composability provides a number of useful features such as disaster recovery across geographical regions (GeoDR), massive read scale (unlimited number of readable secondary nodes), and online migration of databases (across different operating systems, across different operating system versions, and/or between On Premise and cloud-based computing environments), and so on.

The systems and methods of the present disclosure solve many problems faced by the server systems used in today's data centers and provide many solutions including the following. The systems and methods of the present disclosure enable cross-region availability and geographical disaster recovery (GeoDR) for On Premise SQL servers. The systems enable massive read-scale by allowing for unlimited number of readable secondary nodes. The systems enable chaining of replicas so that the burden of replicating the data gets distributed, and the primary replica can maintain its performance for online transaction processing (OLTP). The systems enable online migration without downtime from an On Premise SQL server to an SQL infrastructure-as-a-service (IAAS) cloud server and from an SQL server running on one operating system (e.g., Windows) to an SQL server running on another operating system (e.g., Linux). Further, the systems provision high availability of databases when upgrading the operating system across versions, where the operating system failover clustering is not compatible with its previous version.

The systems and methods of the present disclosure provide these solutions using many features including the following. The systems replicate databases across multiple independent high availability (HA) failover clusters and allow for manual failover and failback. The systems provide composability of multiple availability groups allowing for complex replication topologies. The systems allow chaining of multiple availability groups that lets users provision a tree like structure of replicas and thereby have an unlimited number of secondary replicas without impacting performance. The systems automatically seed new database replicas that make it easy to build a complex topology of distributed availability groups. These and other features of the systems and methods of the present disclosure are described below in detail.

The present disclosure is organized as follows. An overview of the Distributed Availability Group (DAG) architecture and the major software components that provide the functionality of the DAG is first provided with reference to FIGS. 1 and 2. Examples of various topologies made possible by the numerous features of the DAG architecture and the software components are then described with reference to FIGS. 3-5. An example of a server that can be configured as a primary or secondary node for use in the various topologies that utilize the DAG architecture is then explained with reference to FIG. 6. Finally, examples of methods used to implement the various topologies are described with reference to FIGS. 7-10.

Throughout the present disclosure, the following terminology is used.

A database (DB) denotes an organized collection of data, which comprises schemas, tables, queries, reports, views, and other objects.

An availability group (AG) denotes a container for a set of databases, availability databases, that failover together. It's a unit of failover in the topologies discussed below. All databases referenced in the present disclosure are relational databases unless specifically stated otherwise.

An availability replica (or replica) denotes an instantiation of an availability group that is hosted by a specific instance of an SQL server and that maintains a local copy of each availability database that belongs to the availability group.

Node/Machine: A Microsoft Windows Server operating system or a Linux operating system that is an active member of a failover cluster. All servers or nodes referenced in the present disclosure are SQL servers unless specifically stated otherwise. SQL stands for Structured Query Language and is a special-purpose programming language designed for managing data in a relational database management system (RDBMS), or for stream processing in a relational data stream management system (RDSMS).

A Distributed Availability Group (DAG) provides a way to compose two AGs and form a new AG. In a DAG, one AG acts as a primary AG, and the other AG acts as a secondary AG. The primary AG allows read and write operations, and the secondary AG is read only. Changes applied to databases in the primary AG are replicated to databases in the secondary AG. The composability can be extended across many replicas. For example, if A, B, and C are the availability groups, a user can compose the availability groups A and B into a distributed AG say DAG1 and the availability groups B and C into another distributed AG say DAG2. If the availability group A is the primary AG, the data replication will flow from the availability group A to the availability group B, and from the availability group B to the availability group C. This flexible composability allows for a variety of useful topologies described below.

FIG. 1 shows an example of a Distributed Availability Group (DAG) 100 according to the present disclosure. For example, the DAG 100 comprises two availability groups: a first availability group AG1 102 and a second availability group AG2 104. The first availability group AG1 102 may be configured as a primary AG, and the second availability group AG2 104 may be configured as a secondary AG (also called a forwarder or forwarder AG, as described below in further detail).

The first availability group AG1 102 may be connected to the second availability group AG2 104 via a network connection. For example, the network connection may include the Internet, a local area network, a wide area network, or any other suitable network. In some instances, the second availability group AG2 104 may be geographically remote from the first availability group AG1 102. For example, the first availability group AG1 102 and the second availability group AG2 104 may be located in different time zones.

Further, the servers or nodes in the first availability group AG1 102 may use a first operating system, and the servers or nodes in the second availability group AG2 104 may use a second operating system that is different than the first operating system. Alternatively, the servers in the first availability group AG1 102 may use a first version of an operating system, and the servers in the second availability group AG2 104 may use a second version of the operating system that is different than the first version of the operating system. Furthermore, the first availability group AG1 102 may be On Premise, while the second availability group AG2 104 may use a cloud-based computing environment (e.g., Microsoft Azure or Amazon Web Services (AWS)), or vice versa.

A first failover cluster agent FC1 106 provides a clustering functionality described below for the first availability group AG1 102. A second failover cluster agent FC2 108 provides the clustering functionality for the second availability group AG2 104. The first availability group AG1 102 comprises a first cluster of SQL servers or nodes including a primary server 110, and two secondary servers: a first secondary server 112 and a second secondary server 114. The second availability group AG2 104 comprises a second cluster of SQL servers or nodes including a primary server (called a forwarder, which is explained below) 120, and two secondary servers: a first secondary server 122 and a second secondary server 124.

The first and second failover cluster agents FC1 106 and FC2 108 are shown external to the first and second availability groups AG1 102 and AG2 104 for illustrative purposes only. As explained below, these failover cluster agents run on each of the primary and secondary servers of the first and second availability groups AG1 102 and AG2 104. That is, the first failover cluster agent FC1 106 runs on each of the primary server 110, the first secondary server 112, and the second secondary server 114 of the first availability group AG1 102; and the second failover cluster agent FC2 108 runs on each of the forwarder 120, the first secondary server 122, and the second secondary server 124 of the second availability group AG2 104.

Each failover cluster agent coordinates the operations of the primary and secondary servers within the respective availability group. That is, the first failover cluster agent FC1 106 coordinates the operations of each of the primary server 110, the first secondary server 112, and the second secondary server 114 of the first availability group AG1 102; and the second failover cluster agent FC2 108 coordinates the operations of each of the forwarder 120, the first secondary server 122, and the second secondary server 124 of the second availability group AG2 104.

Figure 2:
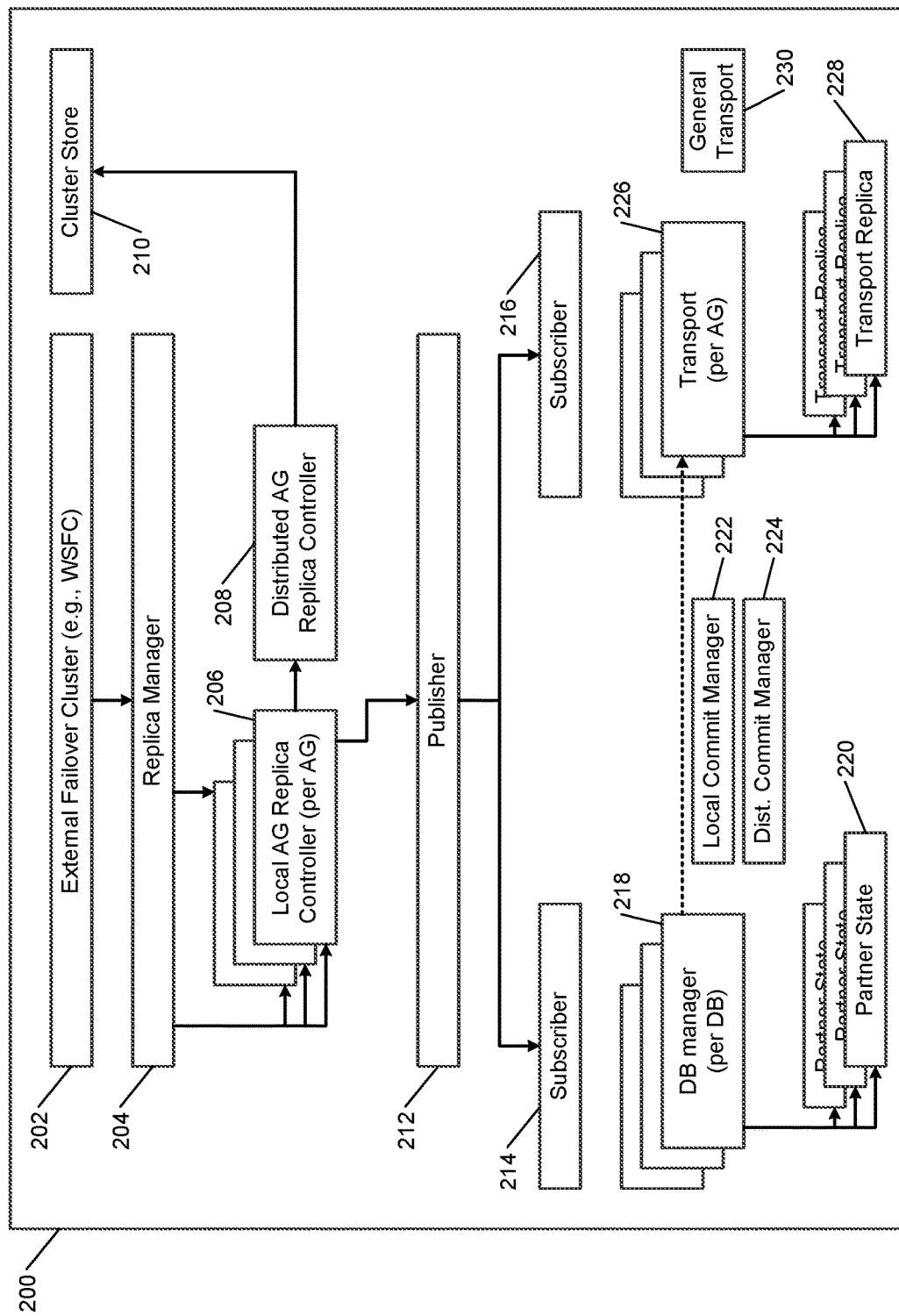
FIG. 2 is an example of a schematic of a software stack used to implement the DAG architecture according to the present disclosure.

FIG. 2 shows an example of a software stack 200 that runs on each server or node of the DAG 100. Specifically, the software stack 200 runs on each of the primary server 110, the first secondary server 112, and the second secondary server 114 of the first availability group AG1 102. Additionally, the software stack 200 also runs on each of the forwarder 120, the first secondary server 122, and the second secondary server 124 of the second availability group AG2 104.

For example, the software stack 200 comprises the following software components: an external failover cluster (FC) agent 202, a replica manager 204, an AG replica controller (per AG) 206, a DAG replica controller 208, a cluster storage 210, a publisher 212, subscribers 214 and 216, a database manager (per database) 218, a partner state component 220, a local commit manager 222, a distributed commit manager 224, a transport component (per AG) 226, a transport replica component 228, and a general transport component 230.

The external failover cluster (FC) agent 202 (hereinafter the FC agent 202) provides clustering functionality in an availability group (AG). That is, there is one FC agent 202 per AG. In Windows Operating System, the FC agent 202 is provided by the Windows Server Failover Cluster (WSFC). For example, in the DAG 100 in FIG. 1, each of the first and second failover cluster agents FC1 106 and FC2 108 (hereinafter the FC agents FC1 106 and FC2 108) may be WSFC1 and WSFC2, respectively. In each AG, the FC agent 202 is responsible for tracking the health of the AG's nodes, detecting failures, electing a leader (primary node), and orchestrating appropriate role changes to transition the nodes to primary or secondary roles.

For example, in the DAG 100 in FIG. 1, in the first availability group AG1 102, the first FC agent FC1 106 (i.e., an instance of the FC agent 202) runs on each of the nodes of the first availability group AG1 102 (i.e., on each of the primary server 110, the first secondary server 112, and the second secondary server 114 of the first availability group AG1 102). The first FC agent FC1 106 is responsible for tracking the health of the nodes of the first availability group AG1 102 including the primary server 110, the first secondary server 112, and the second secondary server 114. The first FC agent FC1 106 is responsible for detecting failures of the nodes of the first availability group AG1 102. The first FC agent FC1 106 is responsible for electing a leader (i.e., a primary node) from the nodes of the first availability group AG1 102 (e.g., the primary server 110). The first FC agent FC1 106 is responsible for orchestrating appropriate role changes to transition the nodes of the first availability group AG1 102 to primary or secondary roles. For example, the first FC agent FC1 106 is responsible for transitioning the first secondary server 112 or the second secondary server 114 into a primary node and for transitioning the primary server 110 into a secondary node as explained below.

In the second availability group AG2 104, the second FC agent FC2 108 (i.e., an instance of the FC agent 202) runs on each of the nodes of the second availability group AG2 104 (i.e., on each of the forwarder 120, the first secondary server 122, and the second secondary server 124 of the second availability group AG2 104). The second FC agent FC2 108 is responsible for tracking the health of the nodes of the second availability group AG2 104 including the forwarder 120, the first secondary server 122, and the second secondary server 124. The second FC agent FC2 108 is responsible for detecting failures of the nodes of the second availability group AG2 104. The second FC agent FC2 108 is responsible for electing a leader (i.e., a primary node) from the nodes of the second availability group AG2 104 (e.g., the forwarder 120). The second FC agent FC2 108 is responsible for orchestrating appropriate role changes to transition the nodes of the second availability group AG2 104 to primary or secondary roles. For example, the second FC agent FC2 108 is responsible for transitioning the first secondary server 122 or the second secondary server 124 into a primary node (e.g., a forwarder) and for transitioning the forwarder (i.e., the primary node) 120 into a secondary node as explained below.

Each SQL Server (i.e., each server in the DAG 100) implements an instance of the replica manager 204 that receives and processes clustering events from a failover cluster. For example, in FIG. 1, in the first availability group AG1 102, each of the primary server 110, the first secondary server 112, and the second secondary server 114 runs an instance of the replica manager 204 that receives and processes clustering events from the FC agent FC1 106 running on each node of the first availability group AG1 102. In the second availability group AG2 104, each of the forwarder 120, the first secondary server 122, and the second secondary server 124 runs an instance of the replica manager 204 that receives and processes clustering events from the second FC agent FC2 108 running on each node of the second availability group AG2 104.

When a SQL Database Administrator creates an availability group on a node, the command is processed by the replica manager 204 on the node, which creates the replica controller 206 to track and control the state of an Availability Replica on the node. For example, when a SQL Database Administrator creates an availability group on the primary server 110, the command is processed by the replica manager 204 on the primary server 110, which creates the replica controller 206 on the primary server 110 to track and control the state of an Availability Replica on the primary server 110. When a SQL Database Administrator creates an availability group on the forwarder 120, the command is processed by the replica manager 204 on the forwarder 120, which creates the replica controller 206 on the forwarder 120 to track and control the state of an Availability Replica on the forwarder 120; and so on.

The node on which the SQL Database Administrator creates an availability group could be hosting multiple Availability Groups and therefore could have a list of replica controllers, one for each availability group as shown in FIG. 2. A failover cluster treats an Availability Group as a failover unit and can send failover related commands such as 'become primary' or 'become secondary', which are processed by the Replica Controller 206 on the node, and the events are then published by the publisher 212 on the node to various subscribers (e.g., the subscribers 214 and 216) on the node.

A user can create a Distributed Availability group (DAG) which associates one availability group with another availability group. When this is done, a "Distributed AG Replica Controller" object is created and associated with an existing Replica Controller. For example, when the DAG 100 is created on a selected node (e.g., the primary server 110 of the first availability group AG1 102), a "Distributed AG Replica Controller" object (element 208 shown in FIG. 2) is created on the selected node (e.g., the primary server 110) and is associated with an existing Replica Controller (element 206 shown in FIG. 2) on the selected node (e.g., the primary server 110). The Distributed AG Replica Controller 208 manages the states of the AG replicas involved, such as transitions between primary, secondary, forwarder replica states.

The Distributed AG Replica Controller 208 manages the configuration of the DAG by storing the configuration on a local failover cluster store of each AG. For example, the Distributed AG Replica Controller 208 on the primary server 110 of the first availability group AG1 102 manages the configuration of the DAG 100 by storing the configuration on the local failover cluster store (e.g., the cluster store 210)

of the first availability group AG1 102. A hash of the configuration is used to route incoming replication messages to the correct replica.

The software stack 200 also includes a publisher subscriber interface. For example, the publisher subscriber interface includes a publisher 212 and subscribers 214 and 216. This publisher subscriber interface is the implementation of the publisher subscriber design pattern. This publisher subscriber interface decouples the replica manager 204 layer from other components such as the DB manager 218 and the transport 226. State changes of the replicas pass through this layer (i.e., the publisher subscriber interface) as events to the DB Manager 218 and the transport 226 so that the DB Manager 218 and the transport 226 can react properly to the events.

The DB manager 218 is the component that manages the role of a particular database in an availability group. For example, the DB manager 218 on the primary server 110 of the first availability group AG1 102 manages the role of a particular database in the first availability group AG1 102. The DB manager 218 on the forwarder 120 of the second availability group AG2 104 manages the role of a particular database in the second availability group AG2 104; and so on.

The DB manager 218 primarily interacts with the database management interfaces in an SQL Server, manages the state and quorum of the database, and starts/stops the log capturing and log applying components of the SQL server. The DB manager 218 maintains a list of "Partner" objects to track the replication state of its secondary replicas such as what log sequence number the "Partner" objects are caught up to (when replicating), whether the "Partner" objects are up or down, and so on.

Figure 3:
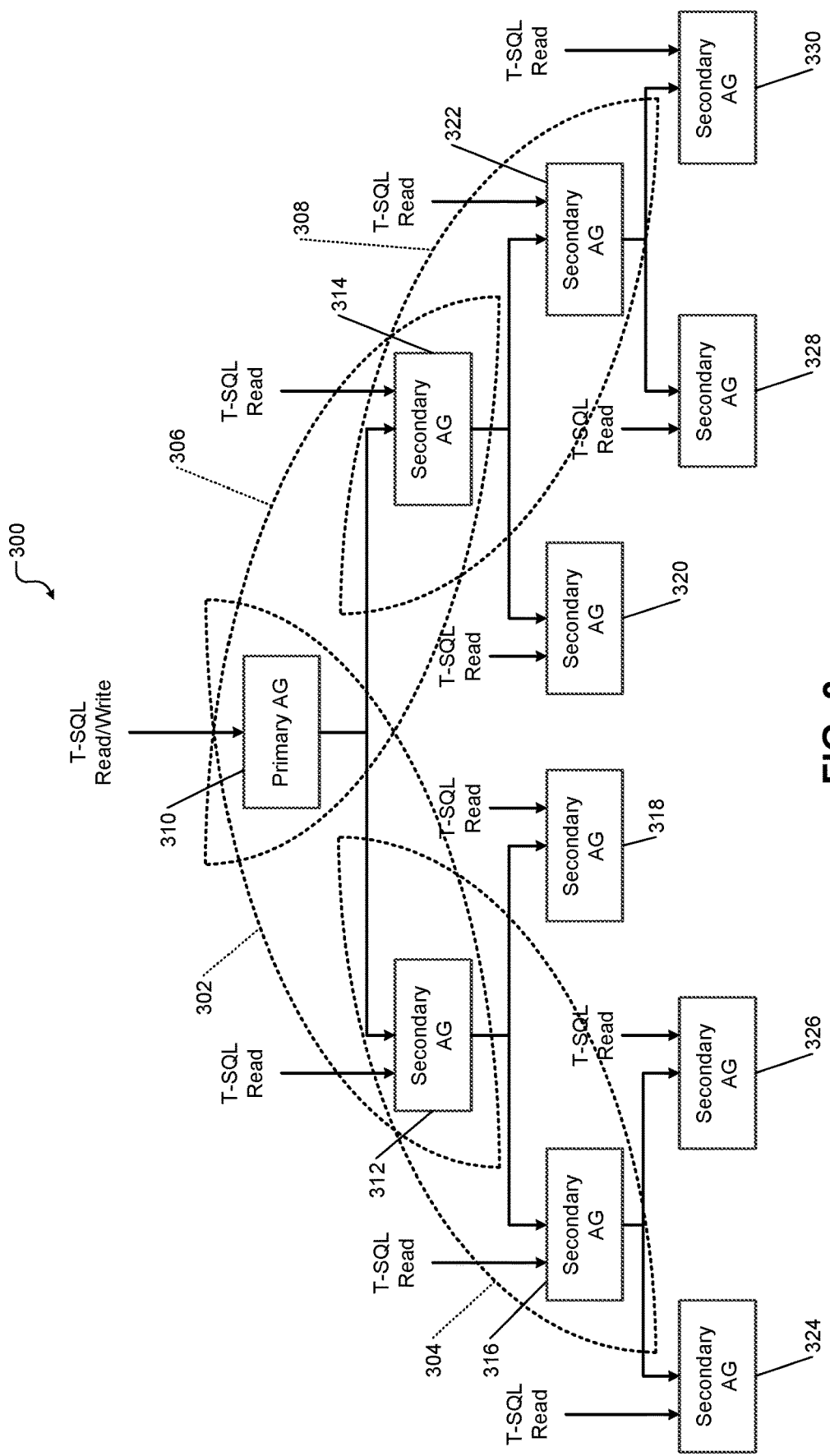
FIG. 3 is a functional block diagram of an example of a system architecture comprising chaining of DAG's to provide massive read scale according to the present disclosure.
Figure 4:
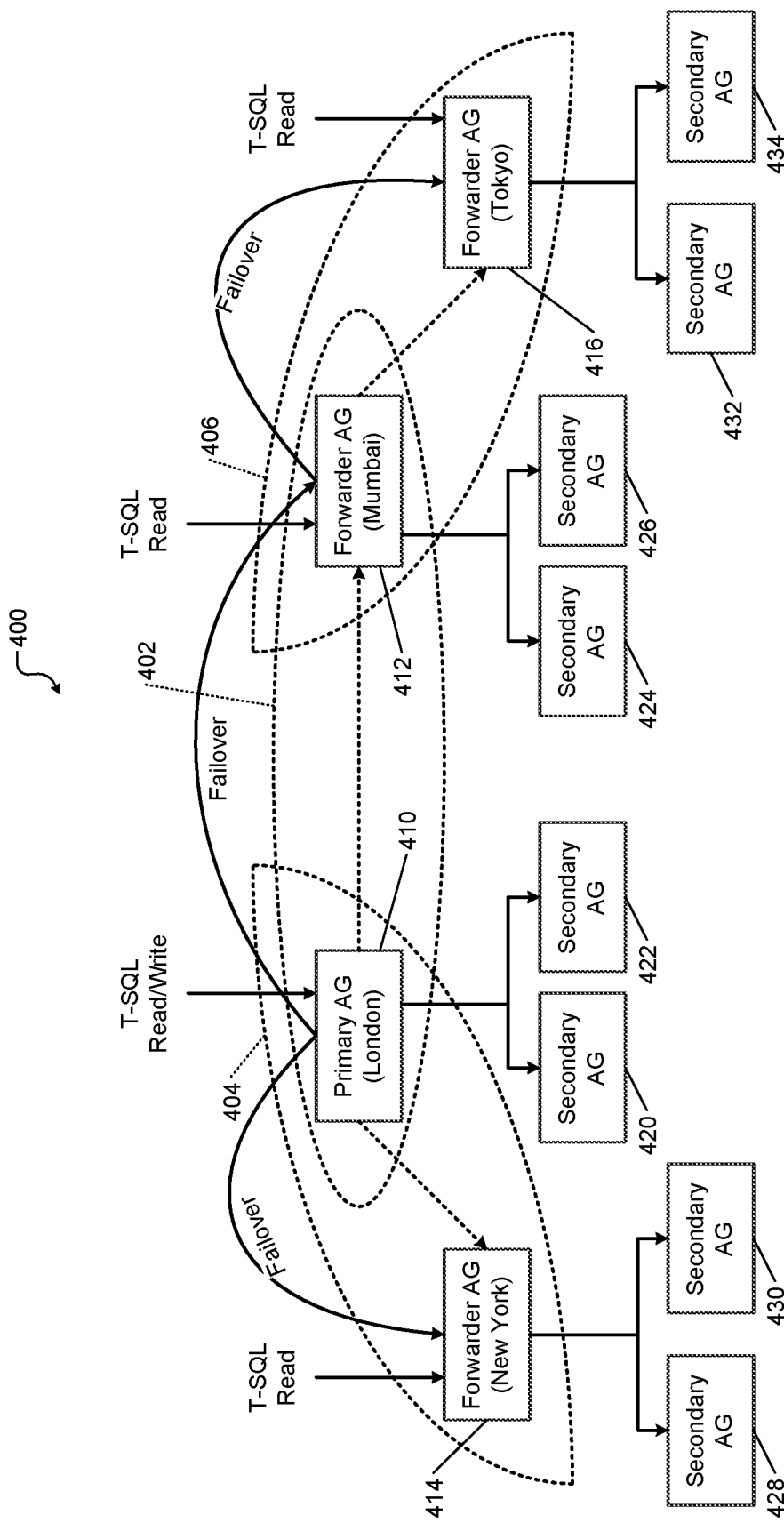
FIG. 4 is a functional block diagram of an example of a system comprising chained DAG's including AG's from different geographical locations to improve global read latency according to the present disclosure.
Figure 5:
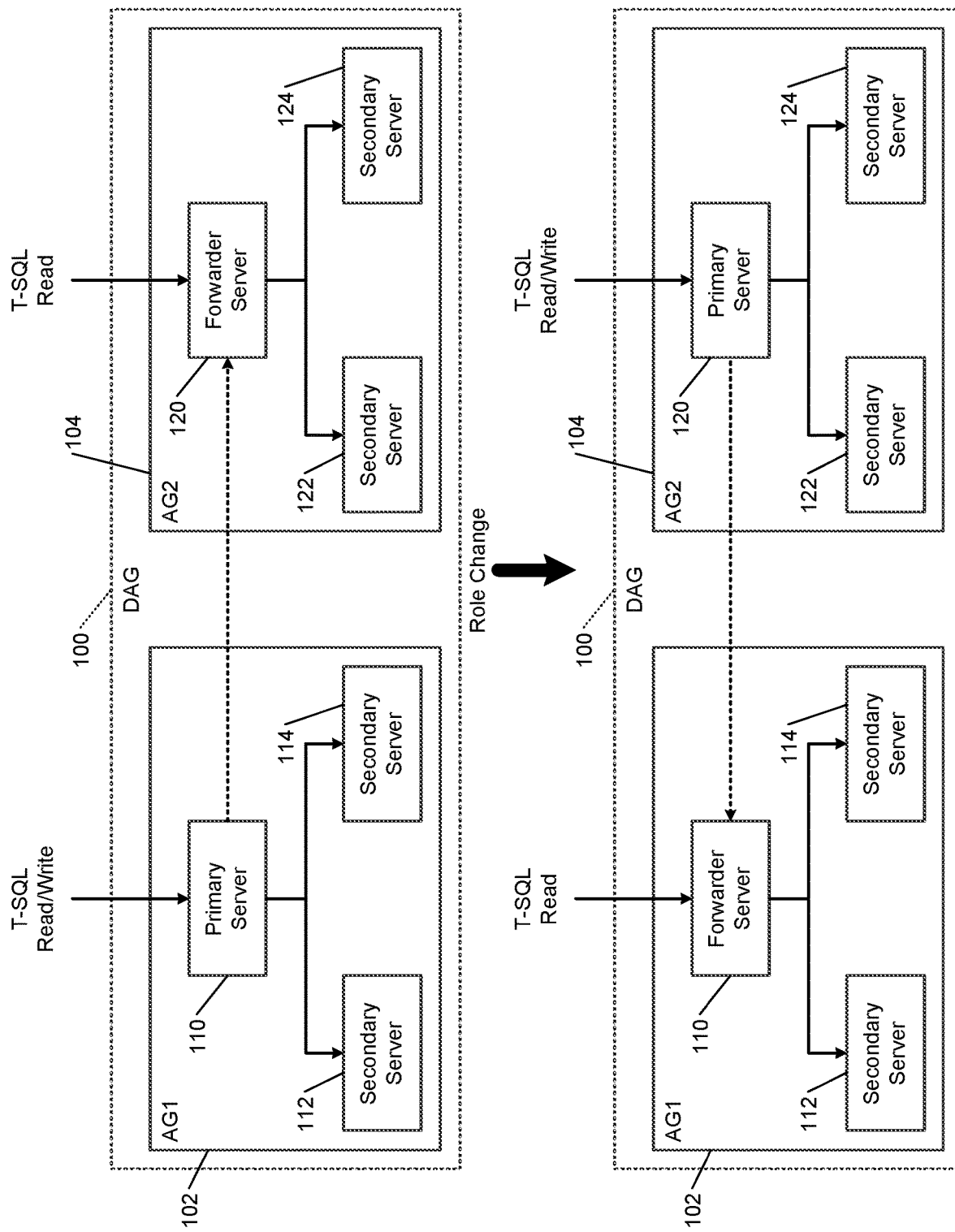
FIG. 5 illustrates an example of a failover using the DAG architecture used to according to the present disclosure.

A commit manager controls transaction commit policy in a high availability (HA) failover topology (e.g., see FIGS. 3-5). For example, the commit policy could be that a transaction commit on the primary node is not acknowledged to a client unless the transaction has been hardened (confirmed to be successfully replicated) on all the synchronous secondary nodes (called a full quorum commit policy). Alternatively, the policy could be to harden (successfully replicate) the transaction on a majority of the synchronous secondary nodes (called a minimum quorum commit policy). For a DAG, a distributed commit manager (element 224 shown in FIG. 2) is added that is different from a local commit manager (element 222 shown in FIG. 2) used for a local AG. This allows the use of a minimum quorum on a local AG, and full quorum on a DAG during DAG failover, which is explained below in further detail.

The transport 226 component is responsible for communication between the primary and secondary replicas. The transport 226 component includes a collection of transport replicas that represent the other side of the communication. The transport 226 component provides abstraction to send/receive messages. Messages exchanged between replicas go through the transport 226 component layer and eventually reach the corresponding DB Manager 218 on a destination node. The DB Manager 218 component registers itself to the transport 226 component to replicate its log to the secondary nodes. There is one transport 226 component per AG. If a DAG is created, a corresponding transport 226 component for the DAG is also created.

The general transport 230 component in the SQL server facilitates communication between different SQL instances. The general transport 230 component builds on top of TCP and provides connection management, authorization, authentication, and other transport related functionalities.

A forwarder (e.g., the forwarder 120 shown in FIG. 1) is a database replica object that can accept a replication stream from a primary node and that can also replicate onwards to its secondary nodes at the same. A forwarder acts as a secondary of the primary AG, and a primary of the secondary AG. A forwarder can also forward the replication stream to another forwarder. This feature or functionality allows several DAGs to be chained as shown in FIGS. 3 and 4.

Seeding is a process of sending a data stream including a log of a replica of a database from a first node directly (i.e., without saving a local copy) to a second node, receiving the data stream at the second node in real time, and creating a replica of (i.e., replicating) the database of the first node on the second node using the data stream received from the first node. The primary and forwarder replicas have the ability to automatically seed databases on new replicas. The primary replica will initiate backups, stream the backups directly to the secondary replicas, which will restore the streams and join the databases into the AG automatically. The backup and restore operations happen simultaneously on both sides, and no local copy of the backup is saved. A DAG is created by having databases in the primary AG build new databases on the secondary AG via the automatic seeding feature. Without this feature, users have to manually backup the databases on the primary node, save the backup to a network share, and then manually restore the backup on each secondary replica before joining them to the AG.

A database has data and log file. An enterprise scale DB for example could have several terabytes of data and only a few gigabytes of log. The log is a sequential circular file. Online transactions are written to the log file and hardened\flushed to disk before being acknowledged to the client, whereas data page updates remain in memory and are lazily flushed. Log file writes are sequential and very fast whereas data page writes tend to be random and not as performant to flush to disk. There are other reasons why logging is performed including the need to recover from crashes without losing data consistency, the need to backup and do point in time restores and so on. The log file is typically small because it is truncated when its older contents are no longer needed after transactions have been committed and data pages have been flushed. Before setting up replication, the secondary database is seeded by sending both data and log from the primary to the secondary side. Thereafter, any future replication from primary to secondary side involves only transmission of the sequentially produced log stream from primary to the secondary side. The secondary side applies the changes described in this log to its data file.

In operation, to create a DAG, a user selects two independent clusters that already have local AGs created on them, and decides to configure one of them as a primary AG and the other as a secondary AG. For example, to create the DAG 100, a user may select the first and second availability groups AG1 102 and AG2 104, and decide to configure the first availability group AG1 102 as the primary AG and the second availability group AG2 104 as the secondary AG.

The user then creates a DAG on a primary cluster replica node by running a T-SQL command. For example, the user creates the DAG 100 by running a T-SQL command on the primary server 110 of the first availability group AG1 102. Internally, a call is made to the Replica Manager which creates a Distributed AG Replica Controller and associates it with the local AG Replica Controller. For example, a call is made to the Replica Manager 204 on the primary server 110, which creates a Distributed AG Replica Controller 208 on the primary server 110 and associates it with the local AG Replica Controller 206 on the primary server 110.

The user then creates a DAG on the remote cluster node and joins it to the primary cluster replica node. For example, the user creates a DAG on the forwarder 120 of the second availability group AG2 104 and joins it to the primary server 110 of the first availability group AG1 102 of the DAG 100.

Once the DAG is created, the two sides (i.e., the primary AG (e.g., the first availability group AG1 102) and the secondary AG (e.g., the second availability group AG2 104)) of the DAG communicate with each other to automatically seed copies of the databases belonging to the AG on the primary side (e.g., the first availability group AG1 102) onto the secondary side (e.g., the second availability group AG2 104).

Once seeding is complete, the primary side (e.g., the first availability group AG1 102) starts continuously replicating the database logs to the secondary side (e.g., the second availability group AG2 104). When a database on the primary side flushes a new log block to its local disk, it will look up its corresponding DB manager component instance, then look up the associated transport component, and then ship (i.e., stream) the log block to the partner secondary of the DAG. For example, when a database on the primary server 110 flushes a new log block to its local disk, the DB manager 218 and the transport 226 on the primary server 110 stream the log file associated with the database to the forwarder 120 of the second availability group AG2 104 for replication.

The replication between the two sides can be configured as synchronous or asynchronous. If configured as synchronous, the write transactions are not acknowledged as successful until the log block has been hardened (successfully replicated) on the other side (e.g., on a secondary or a forwarder node).

If the user wants to failover the DAG primary from one cluster to the other (e.g., to make the forwarder 120 as the new primary and to make the primary server 110 as the new secondary) in a graceful manner without incurring data loss, the following sequence is followed. The replication or seeding from the primary to the secondary side (e.g., from the primary server 110 to the forwarder 120) is set to synchronous. The commit policy on the distributed commit manager is set to full quorum commit. The primary side is instructed to become secondary, which makes the primary side stop accepting new transactions. Then the user uses some management views to ensure all the inflight transactions are hardened (successfully replicated) on the secondary side. Then the user instructs the secondary side to become primary. At this point, the failover is complete, and the new primary (e.g., the forwarder 120) begins handling transactions (e.g., performing read and write operations) for the OLTP system that the primary server 110 handled before the failover. Examples of T-SQL commands for all of the above operations are provided below.

A similar failover procedure can be followed within an availability group as well to switch the roles of the primary and secondary servers within an availability group. For example, a secondary server in an availability group (e.g., the first secondary server 112 in the first availability group AG1 102) and be made a new primary server, and the primary server in the availability group (e.g., the primary server 110 in the first availability group AG1 102) can be made a new secondary server.

Further, in local failover instance (i.e., when switching the roles of the primary and secondary servers within an availability group), one or more secondary servers in the AG may be prevented from being able to change role from secondary to primary state to provide high-availability read performance for the OLTP system. That is, only a selected number of secondary servers in an AG may be allowed to change role from secondary to primary state in case of a failover.

In some situations, the commit policies can be configured so that a remote AG (e.g., the second availability group AG2 104) can be set to receive seeding synchronously only periodically. This scheme can further increase performance of the OLTP system at the expense of a risk of data loss in case of failover.

In use, all the components of the software stack 200 reside on each of the primary and secondary nodes. Specifically, the external failover cluster (FC) agent 202 (hereinafter the FC agent 202) runs on each server in an availability group. The FC agents 202 running on the servers in an availability group communicate with each other to coordinate the clustering activities in the availability group.

The FC agent 202 coordinates the replicas and sends events when there is a failover or any clustering activity. The replica manager 204 monitors these events. For example, on a primary node, the FC agent 202 gets an event, e.g., an event called "become primary." Since the unit of failure is an availability group, if a primary node in an availability group fails, the FC agent 202 on the primary node selects a secondary node and calls "become primary" on each of the availability group resources.

The replica manager 204 on the primary node receives the event. Since each node can host multiple availability groups, the replica manager 204 of the primary node creates a component called the replica controller 206 for each availability group. Accordingly, there is one instance of a local replica controller 206 per availability group.

Each replica controller 206 maintains a state machine. Each replica controller 206 knows whether it is in a primary state or in a secondary state or in transition from one state to another. Each replica controller 206 publishes an event through the publisher 212 to the subscribers 214, 216. For example, the two main subscribers are the DB manager 218 and the transport 226.

The DB manager 218 is a component of which one instance is created per database. An availability group can include one or more databases. Therefore, there is one DB manager 218 per database. Every DB manager 218 maintains states of all its replicas. For example, on the primary node, the DB manager 218 maintains partner states 220 which are states of databases on each of the secondary nodes. Accordingly, as the DB manager 218 on the primary node replicates a database log, it knows how much the DB manager on a secondary node has caught up in replicating the database and whether the secondary node is up or down.

The DB manager 218 also manages the commit policies (shown as the local commit manager 222 and the distributed commit manager 224 (created when a DAG is created)). For example, the commit policies include full commit or quorum commit policies. In full commit policy, all the secondary nodes acknowledge successful replication (hardening) of the database log before a transaction to a database is considered committed; and in quorum commit, a majority of the secondary nodes acknowledge successful replication (hardening) of the database log before a transaction to a database is considered committed.

There is one instance of the transport 226 component per availability group. An availability group can include one primary node and any number of secondary nodes. All the databases in an availability group are replicated on all the secondary nodes in the availability group. The transport 226 component manages connections to all the secondary replicas. For example, there is one transport replica 228 for every connection from the primary to the secondary.

Typically, when data is written to a database, the database log is replicated on each secondary node. The replication thread looks up the DB manager 218 and updates the partner states 220. The DB manager 218 has a link (shown as a dotted line) to the transport 226 component. The replication thread knows the addresses of all the secondary nodes (which change in the event of a failure of a node) through the transport replica 228 components. Accordingly, the replication thread sends the database log to all the secondary nodes for replication.

The general transport 230 component is the networking stack that handles all the TCP connections. The general transport 230 component handles the connection resiliency. For example, if a connection goes down, the general transport 230 component reestablishes the connection.

The distributed AG replica controller 208 is created when a user creates a distributed AG. The distributed AG replica controller 208 is associated with the local AG replica controller 206 of each availability group. The distributed commit manager 224 is also created when the user creates a distributed AG. There is also a separate instance of the transport 226 component for the distributed AG so that the primary node knows where to replicate in the distributed AG.

Thus, in an availability group, when a user designates a node as the primary node, the state machine in the replica controller 206 of the primary node changes state to a primary state and starts the replication process. The replica controller 206 of the primary node provides the replication stream through its transport 226 component to all the secondary nodes. The replica controller 206 of each secondary node processes the replication stream, changes (i.e., updates) its replica, and changes its partner state 220 to indicate the changed status of its replica.

In a DAG, a forwarder in a second availability group of the DAG (e.g., the forwarder 120 in the second availability group AG2 104 of the DAG 100 shown in FIG. 1) acts as a secondary node of the primary node of the first availability group of the DAG (e.g., of the primary node 110 of the first availability group AG1 102 of the DAG 100 shown in FIG. 1). At the same time, the forwarder in a second availability group of the DAG (e.g., the forwarder 120 in the second availability group AG2 104 of the DAG 100 shown in FIG. 1) acts as a primary node for its secondary nodes in the second availability group of the DAG (e.g., the secondary nodes 122 and 124 in the second availability group AG2 104 of the DAG 100 shown in FIG. 1). The components of the software stack 200 run on each of the nodes in the two availability groups and perform their respective functions on each of the nodes in the two availability groups depending on whether the nodes operate as primary or secondary nodes as explained above.

When two distributed AGs are chained (see FIGS. 3 and 4), the primary node of the AG that is common to the two distributed AGs (e.g., in FIG. 3, the primary node of the London AG that is common to the New York and Mumbai AGs) manages its own availability group as well as the two neighboring availability groups. For example, in FIG. 3, the primary node of the London AG that is common to the New York and Mumbai AGs manages the London AG as well the New York and Mumbai AGs. The primary nodes of the two neighboring availability groups act as secondary nodes of the primary node of the AG that is common to the two distributed AGs. For example, the primary nodes of the New York and Mumbai AGs act as secondary nodes of the primary node of the London AG. The components of the software stack 200 run on each of the nodes in the three availability groups and perform their respective functions on each of the nodes in the three availability groups depending on whether the nodes operate as primary or secondary nodes as explained above. The London AG's primary node will run two distributed AG replica controllers 208, one each responsible for the New York and Mumbai AGs; two transport 226 components, one each responsible for communicating with the New York and Mumbai AGs; and two distributed commit managers 224, one each managing commit policies of the New York and Mumbai AGs. Thus, the DAG chaining topology can be extended as shown in FIGS. 3 and 4.

FIG. 1 shows an example of a basic use of a Distributed AG: to provide high cross-region availability for an OLTP system. The DAG 100 includes two independent failover clusters FC1 106 and FC2 108 in two geographical locations. The failover clusters FC1 106 and FC2 108 manage the two Availability Groups in the two geographical locations: the first availability group AG1 102 and the second availability group AG2 104. Composing a Distributed AG across these two AGs allows for data to be replicated from AG1 to AG2. In the event of a failure in the data center in the geographical location where the first availability group AG1 is located, the user can failover to the second availability group AG2 located in a different geographical location and maintain full availability (i.e., provide full read/write support for the OLTP system).

The high-availability is ensured despite the failover to the second availability group AG2 104 since the secondary servers 122 and 124 of the second availability group AG2 104 have replicas of the databases on the primary side. Accordingly, after failover, the secondary servers 122 and 124 of the second availability group AG2 104 can continue to provide uninterrupted read access to users in both geographical locations of AG1 102 and AG2 104 while the forwarder 120 handles the read/write responsibilities for the OLTP system.

FIG. 3 shows another example where a Distributed AG can be used in a more advanced manner than in FIG. 1: to provide massive read scale and real-time analytics. In FIG. 3, a system 300 includes multiple DAG's that are chained together and that create a treelike structure as shown. For example, in the system 300, DAG's 302, 304, 306, and 308 are chained together as shown. The system 300 includes a primary AG 310 that performs the read/write operations for an OLTP system and a plurality of secondary AGs arranged in the treelike structure shown that perform read operations for the OLTP system. Each secondary AG can be a forwarder.

The ovals in FIG. 3 indicate a pair of AGs composed into a DAG. Since there is no limit on how many Distributed AGs can be chained, a user could add a large number of secondary AGs. For example, an SQL server allows 8 replicas in an AG. Accordingly, with just 2 levels of the tree, one can have up to 72 secondary AGs. Since the primary AG would only be replicating to the first level of 8 secondary AGs (only two secondary AGs shown), there is no performance impact on the primary AG of having to replicate to 72 secondary AGs.

Since all the secondary AGs allow reads, the user gets massive read scale (read performance is unaffected by failure of one or more secondary AGs). The SQL server has a high performance log transport and parallel redo of the log on the secondary AGs, which enables the secondary databases to stay within milliseconds of the primary AG. This allows scenarios like real time analytics. The user, for example, can run as many near real time analytics workloads as possible on the secondary AGs without affecting the performance of the OLTP workload running on the primary AG.

The primary AG 310 shown in FIG. 3 may have the configuration of the first availability group AG1 102 shown in FIG. 1. Each secondary AG shown in FIG. 3 may have the configuration of the second availability group AG2 104 shown in FIG. 1. Alternatively, each AG shown in FIG. 3 may include a server, where the primary AG 310 includes a server similar to the primary server 110 of the first availability group AG1 102 shown in FIG. 1, and each secondary AG includes a server similar to the forwarder 120 of the second availability group AG2 104 shown in FIG. 1. Each AG runs the software stack 200 shown in FIG. 2, which operates as described above.

As shown in FIG. 3, a first secondary AG 312 and a second secondary AG 314 descend from the primary AG 310; third and fourth secondary AG's 316, 318 descend from the first secondary AG 312; fifth and sixth secondary AG's 320, 322 descend from the second secondary AG 314; seventh and eighth secondary AG's 324, 326 descend from the third secondary AG 316; ninth and tenth secondary AG's 328, 330 descend from the sixth secondary AG 322; and so on, forming a treelike structure. While not shown, multiple additional secondary AG's descending from the primary AG 310 and further descending from the secondary AGs shown can be added to the system 300.

Multiple DAG's can be configured using the primary AG 310 and the multiple secondary AG's connected in the treelike structure shown. For example, a first DAG 302 may be configured to include the primary AG 310 and the secondary AG 312; and a second DAG 304 may be configured to include the secondary AG's 312 and 316. Further, the first DAG 302 may be chained or linked with the second DAG 304 as shown. In the second DAG 304, the secondary AG 312 functions as a primary AG. While not shown, additional DAG's may be formed using additional secondary AG's descending further down from the secondary AG 324, and the additional DAG's may be chained or linked to the DAG's 302 and 304.

Additionally, a third DAG 306 may be configured to include the primary AG 310 and the secondary AG 314; and a fourth DAG 308 may be configured to include the secondary AG's 314 and 322. Further, the third DAG 306 may be chained or linked with the fourth DAG 308 as shown. In the fourth DAG 308, the secondary AG 314 functions as a primary AG. While not shown, additional DAG's may be formed using additional secondary AG's descending further down from the secondary AG 330, and the additional DAG's may be chained or linked to the DAG's 306 and 308.

In each subsequent DAG in a chain, the secondary AG from a previous DAG functions as a primary AG in a next DAG. Further, while not shown, additional chains of additional DAG's can be configured using the primary AG 310 and the secondary AG's 318, 326, 320, and 328.

FIG. 4 shows another example where a Distributed AG can be used in a more advanced manner than in FIG. 1. Suppose an international company that has multiple sites on different continents. While the main site runs OLTP workload, applications running on other sites could read near real time data from their local sites, which reduces the latency and improves performance. An example is a shopping catalog that is updated infrequently, but read very frequently. By being able to read from a locally available replica the website's responsiveness and consequently user experience greatly improves.

As another example, suppose a SharePoint database accessed by employees globally. Suppose London is the primary business location. All write operations go through the primary AG in London. This works well for employees in London when they save their documents on SharePoint, but employees in Tokyo will have a bad experience because of the latency from Tokyo to London. The topology shown in FIG. 4 allows the primary AG to essentially 'follow the sun', i.e., the primary AG can failover to a particular region (in a different time zone) during peak working hours of that region, so that all employees get overall good user experience.

In FIG. 4, a system 400 includes multiple DAG's comprising AGs located in different time zones (i.e., in different geographical locations) that are chained together as shown. For example, DAG's 402, 404, and 406 are chained together as shown. A first DAG 402 includes a first AG 410 located in a first geographical location in a first time zone (e.g., London) and a second AG 412 located in a second geographical location in a second time zone (e.g., in Mumbai). A second DAG 404 includes the first AG 410 and a third AG 414 located in a third geographical location in a third time zone (e.g., in New York). A third DAG 406 includes the second AG 412 and a fourth AG 416 located in a fourth geographical location in a fourth time zone (e.g., in Tokyo). The AGs 410, 412, 414, and 416 are connected to each other using the Internet or other network.

Each of the AG's at each geographical location additionally includes secondary AG's. For example, in London, the primary AG 410 may be connected to a plurality of secondary AG's 420, 422. In Mumbai, the forwarder AG 412 may be connected to a plurality of secondary AG's 424, 426. In New York, the forwarder AG 414 may be connected to a plurality of secondary AG's 428, 430. In Tokyo, the forwarder AG 416 may be connected to a plurality of secondary AG's 432, 434. While not shown, at each location, many additional secondary AG's may be connected to the respective primary and forwarder AG's. For example, each location may include the configuration shown in FIG. 3.

Each primary AG shown in FIG. 4 may have the configuration of the first availability group AG1 102 shown in FIG. 1. Each forwarder AG shown in FIG. 4 may have the configuration of the second availability group AG2 104 shown in FIG. 1. Alternatively, each AG shown in FIG. 4 may include a server, where a primary AG includes a server similar to the primary server 110 of the first availability group AG1 102 shown in FIG. 1, and each forwarder AG includes a server similar to the forwarder 120 of the second availability group AG2 104 shown in FIG. 1. Each AG runs the software stack 200 shown in FIG. 2, which operates as described above.

After the normal business hours of a first location (e.g., London), the primary AG of the first location fails over to a second location where normal business hours of the second location are about to begin. After failing over, the primary AG of the first location supports only read operations for the OLTP system while the AG of the second location, which supported only read operations before the failover, becomes a primary AG and begins supporting read/write operations for the OLTP system. Thus, at each location, during normal business hours of that location (e.g., 8 am to 5 pm local time), the local AG may support read/write operations for the OLTP system.

FIG. 5 shows a scenario where a user can use Distributed AGs to perform online database migrations, i.e., move databases from one environment to another without downtime. This scenario takes advantage of the fact that Distributed AG does not require homogenous environments on both the sides. The operating system could be different (e.g., Windows Vs. Linux) on both the sides. The infrastructure could be different (on premise VS. virtual machines (VMs) in cloud) on both the sides. In some situations, the operating system may be the same but the versions of the operating system could be different on both the sides. This DAG-based topology allows customers to move their databases across different environments without down time. For example, customers will be able to move their databases without downtime from an On Premise datacenter to a cloud-based environment (e.g., Microsoft Azure, or Amazon Web Services (AWS); or from SQL on Windows to SQL on Linux, and vice versa).

For example, in FIG. 5, the first availability group AG1 102 may represent a first data center, and the second availability group AG2 104 may represent a second data center. The first availability group AG1 102 may use any of SQL on Windows, SQL on Linux, SQL VM on Azure, and SQL VM on AWS. Similarly, the second availability group AG2 104 may also use any of SQL on Windows, SQL on Linux, SQL VM on Azure, and SQL VM on AWS. The online database migration can be achieved by performing the failover steps described above (briefly, by setting replication from AG1 102 to AG2 104 to synchronous; then setting the commit policy on the distributed commit manager to full quorum commit; then instructing the primary AG to become secondary AG, which makes the primary AG to stop accepting new transactions; then ensuring that all inflight transactions are hardened (successfully replicated) on the secondary AG; and then finally instructing the secondary AG to become the primary AG).

Figure 6:
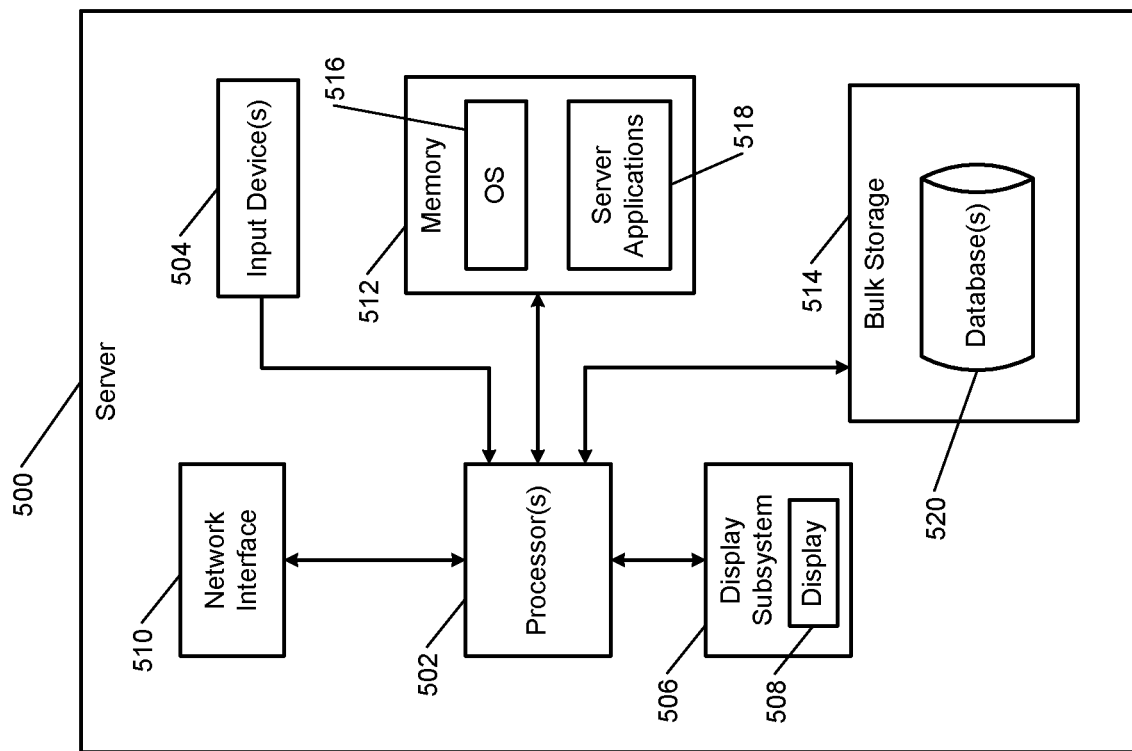
FIG. 6 is a functional block diagram of an example of a server used to implement an AG according to the present disclosure.

FIG. 6 shows a simplified example of a server 500. The server 500 can be used to implement any availability group and server described in this disclosure. The server 500 typically includes one or more CPUs or processors 502, one or more input devices 504 (e.g., a keypad, touchpad, mouse, and so on), a display subsystem 506 including a display 508, a network interface 510, a memory 512, and a bulk storage 514.

The network interface 510 connects the server 500 to a distributed network system comprising one or more other servers (e.g., servers similar to the server 500 used in other AG's and/or DAG's) via a suitable network (e.g., a local area network, a wide area network, the Internet, or a combination thereof). For example, the network interface 510 may include a wired interface (e.g., an Ethernet interface) and/or a wireless interface (e.g., a Wi-Fi, Bluetooth, near field communication (NFC), or other wireless interface). The memory 512 may include volatile or nonvolatile memory, cache, or other type of memory. The bulk storage 514 may include flash memory, one or more hard disk drives (HDDs), or other bulk storage device.

The processor 502 of the server 500 executes an operating system (OS) 516 and one or more server applications 518, which include an application that runs the software stack 200 shown in FIG. 2, and may include may include an OLTP application. The bulk storage 514 may store one or more databases 520 that store data structures used by the server applications 518 to perform respective functions.

FIGS. 7-10 show flowcharts of various methods for configuring availability groups and distributed availability groups according to the present disclosure. The methods provide various features or functions including database replication, failover without data loss, increased read latency across availability groups located in different geographical locations, and massive read scale, by using the distributed availability group architecture as explained above with references to FIGS. 1-5. The methods utilize an application including the software stack 200 shown in FIG. 2 executed by one or more servers of the kind shown in FIG. 6. The methods are performed by one or more servers of the kind shown in FIG. 6 by utilizing the software stack 200 shown in FIG. 2.

In the following discussion, control refers to an application including the software stack 200 shown in FIG. 2 executed by one or more servers of the kind shown in FIG. 6. Control also encompasses any other software application(s) running on the one or more servers that may provide the described functionality.

Figure 7:
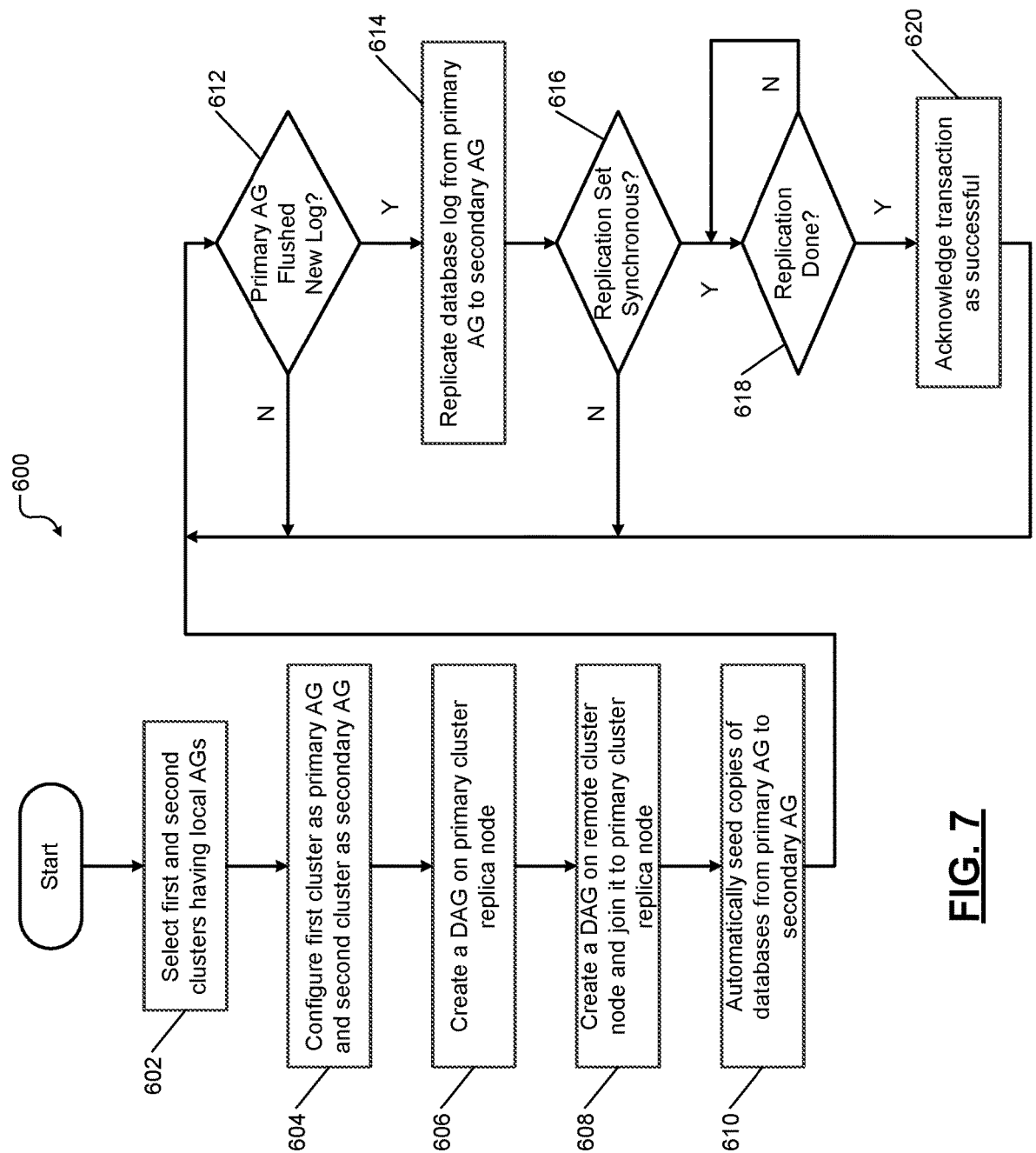
FIG. 7 is a flowchart of an example of a method for configuring a DAG and replicating a database in the DAG according to the present disclosure.

FIG. 7 shows an example of a method 600 for configuring a distributed availability group and replicating a database in the distributed availability group according to the present disclosure. At 602, control allows a user to select first and second clusters having local availability groups (e.g., the first availability group AG1 102 and the second availability group AG2 104 shown in FIG. 1). At 604, control allows the user to configure the first cluster as a primary AG and the second cluster as a secondary AG. At 606, control allows the user to create a distributed AG on the primary cluster replica node. At 608, control allows the user to create a DAG on the remote cluster node and to join it to the primary cluster replica node. At 610, control automatically seeds one or more databases from the primary AG to the secondary AG.

At 612, control determines whether the primary AG flushed a new log to its local disk (following an update to a local database, for example, due to a write operation to the local database). At 614, if the primary AG flushed a new log file, control replicates the database log from the primary AG to the secondary AG by sending a data stream including the database log from the primary AG directly to the secondary AG. At 616, control determines whether the database replication process from the primary AG to the secondary AG is set to be synchronous. At 618, if the database replication process is set to synchronous, control determines whether the replication of the new log is in fact completed successfully on the secondary AG. At 620, if the replication of the new log is in fact completed successfully on the secondary AG, control allows the primary AG to acknowledge that the transaction that initiated the flushing of the new log is successful. This method ensures that if the primary AG were to fail over to the secondary AG, the failover would be without incurring data loss.

Figure 8:
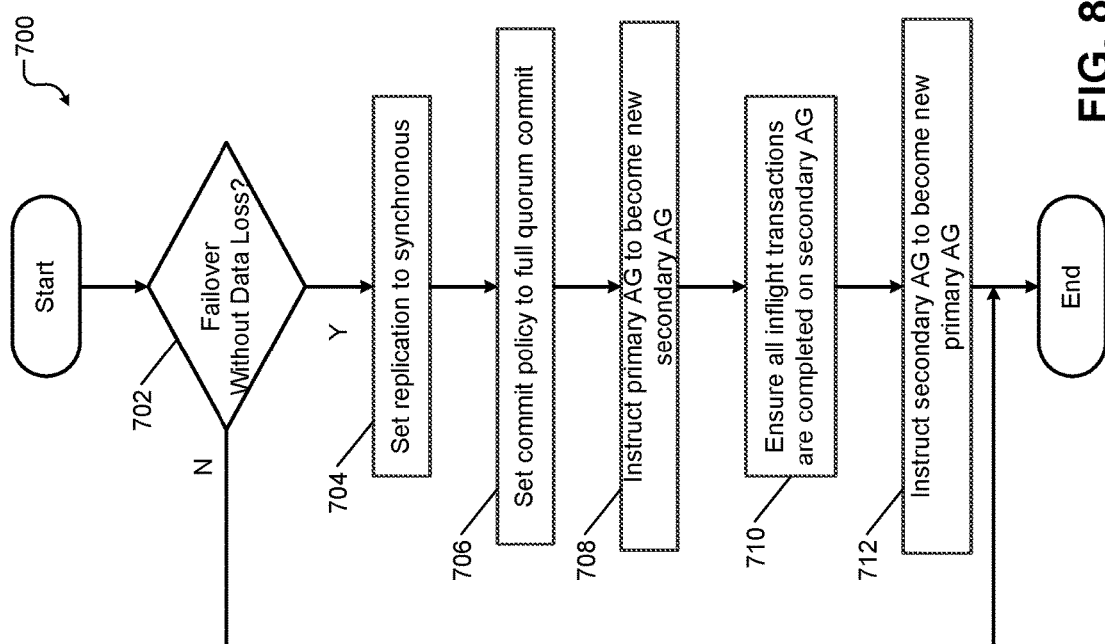
FIG. 8 is a flowchart of an example of a method for performing failover in a DAG according to the present disclosure.

FIG. 8 shows an example of a method 700 for performing failover in a distributed availability group according to the present disclosure. At 702, control determines whether a distributed AG is to be configured to allow failover from a primary AG to a secondary AG without data loss. At 704, if the distributed AG is to be configured to allow failover without data loss, control allows the user to set the database replication process from the primary AG to the secondary AG to be synchronous. At 706, control allows the user to set the commit policy to full quorum commit. At 708, control allows the user to instruct the primary AG to switch state to a secondary AG. At 710, control allows the user to ensure that all in-flight transactions are completed on the original secondary AG. At 712, control allows the original secondary AG to switch state to the new primary AG. Subsequently, the new primary AG begins replicating the database(s) from the new primary AG to the new secondary AG.

Figure 9:
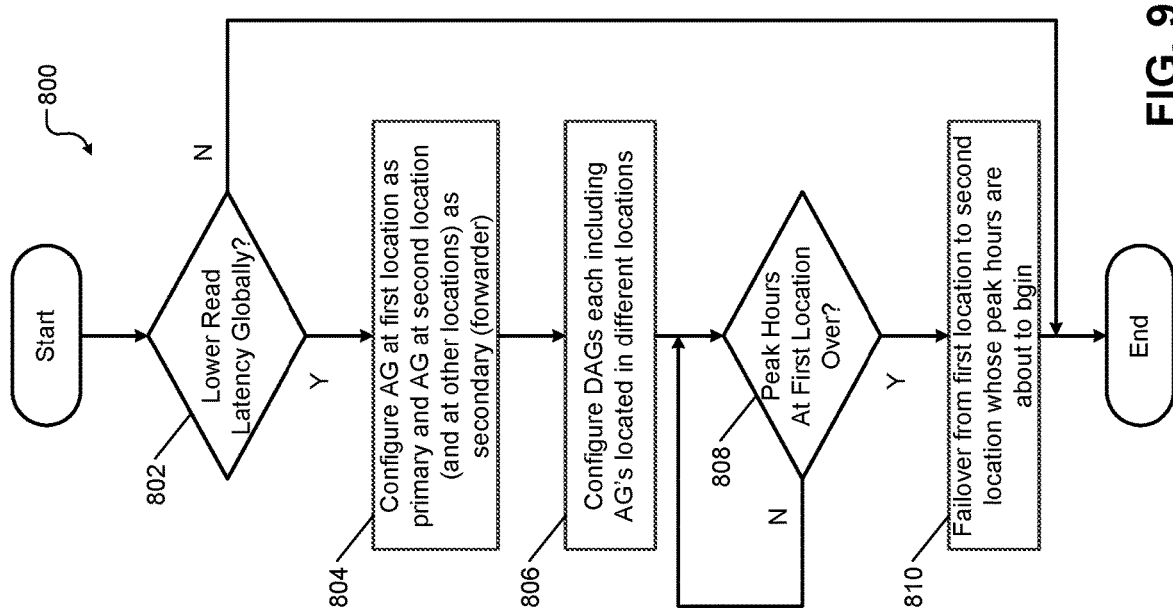
FIG. 9 is a flowchart of an example of a method for chaining DAG's including AG's from different geographical locations to improve read latency on a global scale according to the present disclosure.

FIG. 9 shows an example of a method 800 for chaining DAG's including AG's from different geographical locations to improve read latency on a global scale according to the present disclosure. At 802, control determines whether availability groups located at different geographical locations should be configured to improve read latency on a global scale. At 804, if the availability groups are to be configured to improve read latency on a global scale, control allows the user to configure an AG at a first location as a primary AG and an AG at a second location (and AGs at other locations) as a secondary (forwarder) AG. At 806, control allows the user to configure multiple distributed AG's each including two availability groups located at two geographical locations (e.g., see FIG. 4 and corresponding description above). For example, control allows the user to configure a DAG including the AG's at the first and second locations. At 808, control determines whether the normal business hours (also called peak hours) at the first location are over. At 810, if the normal business hours at the first location are over, the primary AG at the first location fails over to the forwarder AG at the second location, where peak hours are about to begin.

Figure 10:
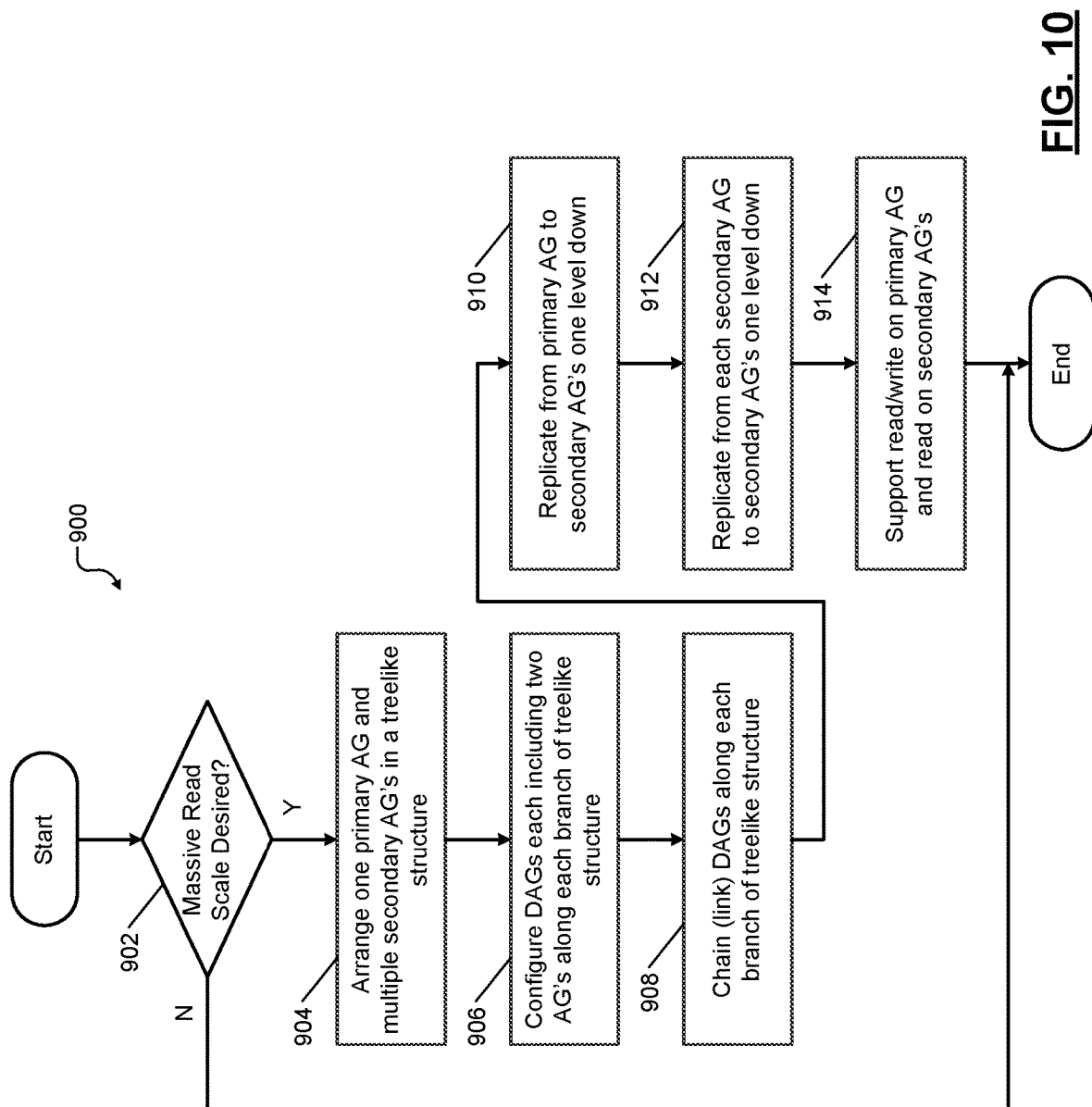
FIG. 10 is a flowchart of an example of a method for chaining DAG's in a treelike structure to provide massive read scale according to the present disclosure.

FIG. 10 shows an example of a method 900 for chaining distributed availability groups in a treelike structure to provide massive read scale according to the present disclosure. At 902, a user determines whether massive read scale is desired. At 904, if massive read scale is desired, control allows the user to arrange one primary AG and multiple secondary AG's in a treelike structure (e.g., see FIG. 3 and corresponding description above). At 906, control allows the user to configure multiple distributed AG's each including two AG's along each branch of the treelike structure (e.g., see DAG's 302, 304, 306 and, 308 shown in FIG. 3 and corresponding description above). At 908, control allows the user to chain (link) the DAG's along each branch of the treelike structure (e.g., see DAG's 302, 304, 306 and, 308 shown in FIG. 3 and corresponding description above).

At 910, control replicates databases from the primary AG to the secondary AG's that are one level down from the primary AG (e.g., from the primary AG 310 to the secondary AG's 312 and 314 shown in FIG. 3 above). At 912, control replicates the databases from each secondary AG to another secondary AG one level down from that secondary AG (e.g., see FIG. 3 and corresponding description above). At 914, control supports read/write operations for an OLTP system on the primary AG and read operations for the OLTP system on all of the secondary AG's. Since the chaining of the DAG's including the secondary AG's can be extended along each branch of the treelike structure to any desired scale, this method provides massive read scale.

Below are examples of T-SQL commands to set up, monitor, and failover DAGs. The following example sets up a distributed AG with automatic seeding:
Assumption: "ag1"-Primary AG; "ag2"-Secondary AG
a. Create DAG on the primary replica of "ag1".

```
CREATE AVAILABILITY GROUP [distributeddag]
    WITH (DISTRIBUTED)
    AVAILABILITY GROUP ON
        'ag1' WITH
        (
            LISTENER_URL = 'tcp://ag1-listener:5022',
            AVAILABILITY_MODE = ASYNCHRONOUS_COMMIT,
            FAILOVER_MODE = MANUAL,
            SEEDING_MODE = AUTOMATIC
        ),
        'ag2' WITH
```

-continued

```
        (
            LISTENER_URL = 'tcp://ag2-listener:5022',
            AVAILABILITY_MODE = ASYNCHRONOUS_COMMIT,
            FAILOVER_MODE = MANUAL,
            SEEDING_MODE = AUTOMATIC
        );
```

Join DAG on the primary replica of "ag2". This will become the forwarder.

```
ALTER AVAILABILITY GROUP [distributeddag]
    JOIN
    AVAILABILITY GROUP ON
        'ag1' WITH
        (
            LISTENER_URL = 'tcp://ag1-listener:5022',
            AVAILABILITY_MODE = ASYNCHRONOUS_COMMIT,
            FAILOVER_MODE = MANUAL,
            SEEDING_MODE = AUTOMATIC
        ),
        'ag2' WITH
        (
            LISTENER_URL = 'tcp://ag2-listener:5022',
            AVAILABILITY_MODE = ASYNCHRONOUS_COMMIT,
            FAILOVER_MODE = MANUAL,
            SEEDING_MODE = AUTOMATIC
        );
```

The following 4 DMVs can be used to view the state of the DAG:
SELECT * from sys.dm_hadr_database_replica_states
SELECT * from sys.dm_hadr_availability_replica_states
SELECT * from sys.dm_hadr_availability_group_states
SELECT * from sys.availability_groups The following steps demonstrates how the customer can do failover for a distributed AG:

a. Change the distributed AG to synchronous commit mode on global primary and forwarder if not already.

```
ALTER AVAILABILITY GROUP [distributeddag] MODIFY
    AVAILABILITY GROUP ON
        'ag1' WITH
        (
            LISTENER_URL = 'tcp://ag1-listener:5022',
            AVAILABILITY_MODE = ASYNCHRONOUS_COMMIT,
            FAILOVER_MODE = MANUAL,
            SEEDING_MODE = AUTOMATIC
        ),
        'ag2' WITH
        (
            LISTENER_URL = 'tcp://ag2-listener:5022',
            AVAILABILITY_MODE = SYNCHRONOUS_COMMIT,
            FAILOVER_MODE = MANUAL,
            SEEDING_MODE = AUTOMATIC
        );
``` b. Wait until status of replica state of ag2 has changed to SYNCHRONIZED on global primary.

```
SELECT   ag.name, drs.database_id, drs.group_id, drs.replica_id,
         drs.synchronization_state_desc, drs.end_of_log_lsn
FROM     sys.dm_hadr_database_replica_states drs,
         sys.availability_groups ag
WHERE    drs.group_id = ag.group_id
```

Watch the row with 'distributeddag' in the first column. If it has its synchronization state changed to SYNCHRONIZED then we are good to go to the next step. Else run this in 5 second intervals till the state has changed to SYNCHRONIZED.

c. Change the DAG Primary role to Secondary on global primary.
   ALTER AVAILABILITY GROUP [ag1] SET (ROLE=SECONDARY)
d. Test failover readiness on global primary.

| | |
|---|---|
| SELECT | ag.name, drs.database_id, drs.group_id, drs.replica_id, drs.synchronization_state_desc, drs.end_of_log_lsn |
| FROM | sys.dm_hadr_database_replica_states drs, sys.availability_groups ag |
| WHERE | drs.group_id = ag.group_id |

Check for the following two conditions:
a. Synchronization_state of 'distributeddag' is still SYNCHRONIZED
b. end-of-log LSN of both 'ag1' and 'ag2' match
If true for both the above, proceed to next step.
e. Failover on the forwarder:
   ALTER AVAILABILITY GROUP [ag2]
   FORCE_FAILOVER_ALLOW_DATA_LOSS The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method comprising:
   performing first read and write operations for an online transaction processing system using a relational database on a primary availability group during a first portion of a day during which a secondary availability group located in a different time zone than the primary availability group and having a replica of the relational database on the secondary availability group performs first read-only operations for the online transaction processing system, wherein the primary availability group comprises a first cluster of servers, and wherein the secondary availability group comprises a second cluster of servers;
   performing second read-only operations for the online transaction processing system during a second portion of the day during which the secondary availability group performs second read and write operations for the online transaction processing system using the replica of the relational database on the secondary availability group;
   sending a first log file associated with the relational database on the primary availability group from the primary availability group directly to the secondary availability group to replicate the relational database on the secondary availability group following a first write operation to the relational database on the primary availability group when the primary availability group performs the first read and write operations and the secondary availability group performs the first read-only operations during the first portion of the day;
   acknowledging the first write operation to the relational database on the primary availability group as being successful after receiving a confirmation from the secondary availability group that the secondary availability group successfully completed replication of the relational database on the secondary availability group after receiving the first log file;
   receiving a second log file associated with the relational database on the secondary availability group directly from the secondary availability group to replicate the relational database on the primary availability group following a second write operation to the relational database on the secondary availability group when the secondary availability group performs the second read and write operations and the primary availability group performs the second read-only operations during the second portion of the day; and
   send a confirmation from the primary availability group to the secondary availability group that the primary availability group successfully completed replication of the relational database on the primary availability group after receiving the second log file from the secondary availability group, wherein the secondary availability group is configured to acknowledge the second write operation to the relational database on the secondary availability group as being successful after receiving the confirmation from the primary availability group.

2. The method of claim 1 further comprising sending the first log file along with a corresponding data file from the primary availability group directly to the secondary availability group without saving a copy of the first log file and the corresponding data file.

3. The method of claim 1 further comprising receiving the second log file along with a corresponding data file at the primary availability group, wherein the primary availability group receives the second log file and the corresponding data file from the secondary availability group, and wherein the secondary availability group sends the second log file and the corresponding data file to the primary availability group without saving a copy of the second log file and the corresponding data file.

4. The method of claim 1, further comprising executing different operating systems or different versions of an operating system on the primary availability group and the secondary availability group.

5. The method of claim 1, wherein one of the primary availability group and the secondary availability group is located in a cloud-based computing environment.

6. The method of claim 1, further comprising implementing a failover from the primary availability group to the secondary availability group, the failover being implemented at a scheduled time between the first portion of the day and the second portion of the day.

7. The method of claim 6, wherein implementing the failover comprises:
   providing a first instruction to the primary availability group to become secondary, wherein the primary availability group stops accepting new transactions in response to the first instruction;
   ensuring that previous transactions have been successfully replicated on the secondary availability group; and
   providing a second instruction to the secondary availability group to become primary.

8. The method of claim 6, wherein implementing the failover further comprises setting replication from the primary availability group to the secondary availability group as synchronous.

9. The method of claim 6, wherein implementing the failover further comprises setting a commit policy to full quorum commit.

10. A system comprising:
    a processor and memory; and
    an application stored in the memory and executed by the processor to:
      perform first read and write operations for an online transaction processing system using a relational database on a primary availability group during a first portion of a day during which a secondary availability group located in a different time zone than the primary availability group and having a replica of the relational database on the secondary availability group performs first read-only operations for the online transaction processing system, wherein the primary availability group comprises a first cluster of servers, and wherein the secondary availability group comprises a second cluster of servers;
      perform second read-only operations for the online transaction processing system during a second portion of the day during which the secondary availability group performs second read and write operations for the online transaction processing system using the replica of the relational database on the secondary availability group;
      send a first log file associated with the relational database on the primary availability group from the primary availability group directly to the secondary availability group to replicate the relational database on the secondary availability group following a first write operation to the relational database on the primary availability group when the primary availability group performs the first read and write operations and the secondary availability group performs the first read-only operations during the first portion of the day;

acknowledge the first write operation to the relational database on the primary availability group as being successful after receiving a confirmation from the secondary availability group that the secondary availability group successfully completed replication of the relational database on the secondary availability group after receiving the first log file;

receive a second log file associated with the relational database on the secondary availability group directly from the secondary availability group to replicate the relational database on the primary availability group following a second write operation to the relational database on the secondary availability group when the secondary availability group performs the second read and write operations and the primary availability group performs the second read-only operations during the second portion of the day; and send a confirmation from the primary availability group to the secondary availability group that the primary availability group successfully completed replication of the relational database on the primary availability group after receiving the second log file from the secondary availability group, wherein the secondary availability group is configured to acknowledge the second write operation to the relational database on the secondary availability group as being successful after receiving the confirmation from the primary availability group.

11. The system of claim 10, wherein the application is further configured to send the first log file along with a corresponding data file from the primary availability group directly to the secondary availability group without saving a copy of the first log file and the corresponding data file.

12. The system of claim 10, wherein the application is further configured to receive the second log file along with a corresponding data file at the primary availability group, wherein the primary availability group receives the second log file and the corresponding data file from the secondary availability group, and wherein the secondary availability group sends the second log file and the corresponding data file to the primary availability group without saving a copy of the second log file and the corresponding data file.

13. The system of claim 10, wherein the primary availability group and the secondary availability group execute different operating systems or different versions of an operating system.

14. The system of claim 10, wherein at least one of the primary availability group and the secondary availability group is located in a cloud-based computing environment.

15. The system of claim 10, wherein:
the first cluster of servers comprises a first primary server and a first secondary server; and
the second cluster of servers comprises a second primary server and a second secondary server.

16. The system of claim 10, wherein:
each availability group comprises a failover cluster agent; and
the failover cluster agent corresponding to a particular availability group is configured to track server health within the availability group and orchestrate role changes among servers within the availability group.

17. The system of claim 10, wherein:
the primary availability group and the secondary availability group form a first distributed availability group; and
the primary availability group is also part of a second distributed availability group that comprises an additional secondary availability group.

18. The system of claim 17, wherein:
the primary availability group is located in a first time zone;
the secondary availability group is located in a second time zone that is distinct from the first time zone; and
the additional secondary availability group is located in a third time zone that is distinct from the first time zone and the second time zone.

19. The system of claim 10, wherein the application is further executed by the processor to initiate a failover from the primary availability group to the secondary availability group, the failover being initiated at a scheduled time between the first portion of the day and the second portion of the day.

20. The system of claim 19, wherein implementing the failover comprises:
providing a first instruction to the primary availability group to become secondary, wherein the primary availability group stops accepting new transactions in response to the first instruction;
ensuring that previous transactions have been successfully replicated on the secondary availability group; and
providing a second instruction to the secondary availability group to become primary.

* * * * *